United States Patent
Jiménez et al.

(10) Patent No.: US 10,075,519 B2
(45) Date of Patent: Sep. 11, 2018

(54) CONNECTION MECHANISM FOR ENERGY-EFFICIENT PEER-TO-PEER NETWORKS

(71) Applicant: Telefonaktiebolaget L M Ericsson (publ), Stockholm (SE)

(72) Inventors: Jaime Jiménez, Helsinki (FI); Gonzalo Camarillo Gonzalez, Helsinki (FI); Manuel Urueña Pascual, Leganés (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 704 days.

(21) Appl. No.: 14/655,197

(22) PCT Filed: Jan. 3, 2014

(86) PCT No.: PCT/EP2014/050061
§ 371 (c)(1),
(2) Date: Jun. 24, 2015

(87) PCT Pub. No.: WO2014/108356
PCT Pub. Date: Jul. 17, 2014

(65) Prior Publication Data
US 2015/0334181 A1 Nov. 19, 2015

Related U.S. Application Data

(60) Provisional application No. 61/750,982, filed on Jan. 10, 2013.

(51) Int. Cl.
*H04L 29/08* (2006.01)
*H04W 4/70* (2018.01)

(52) U.S. Cl.
CPC ...... *H04L 67/1076* (2013.01); *H04L 67/1046* (2013.01); *H04L 67/1051* (2013.01);
(Continued)

(58) Field of Classification Search
CPC ............. H04L 67/1076; H04L 67/1097; H04L 67/2861; H04L 67/1093; H04L 67/1051;
(Continued)

(56) References Cited

U.S. PATENT DOCUMENTS 7,266,125 B2 * 9/2007 Xu ........................ H04L 67/104
370/400
7,379,428 B2 * 5/2008 Xu ........................... H04L 45/04
370/254
(Continued)

FOREIGN PATENT DOCUMENTS

EP 2519071 A2 * 10/2012 ............ H04W 84/20
WO WO 2014048450 A1 * 4/2014 ............ H04W 4/18

OTHER PUBLICATIONS

Ali, M. et al., "CSN: A Network Protocol for Serving Dynamic Queries in Large-Scale Wireless Sensor Networks", Proceedings of the Second Annual Conference on Communication Networks and Services Research, May 19, 2004, pp. 165-174, IEEE.
(Continued)

*Primary Examiner* — Kostas Katsikis
(74) *Attorney, Agent, or Firm* — Coats & Bennett, PLLC

(57) ABSTRACT

A communications system comprising a plurality of nodes communicatively connected via a communications network, each node comprising a processing circuit and network interface circuitry connected to the processing circuit, each node being configured to connect to the communications network and to communicate with other nodes of the communications system, the communications system comprising at least one cluster of nodes, wherein one of the nodes of the cluster is operable to perform a cluster head role connecting the cluster to the communications network, and wherein the cluster is operable to implement a mechanism
(Continued)

for transferring the cluster head role from one node of the cluster to another node of the cluster.

13 Claims, 9 Drawing Sheets

(52) U.S. Cl.
CPC ...... *H04L 67/1093* (2013.01); *H04L 67/1097* (2013.01); *H04L 67/2861* (2013.01); *H04W 4/70* (2018.02); *H04L 67/1055* (2013.01); *Y02D 30/40* (2018.01); *Y02D 70/00* (2018.01); *Y02D 70/21* (2018.01); *Y02D 70/22* (2018.01)

(58) Field of Classification Search
CPC .. H04L 67/1046; H04L 67/1055; H04W 4/70; Y02D 70/00; Y02D 70/21; Y02D 70/22; Y02D 30/40
See application file for complete search history.

(56) References Cited

U.S. PATENT DOCUMENTS

| | | | | |
|---|---|---|---|---|
| 7,401,132 B1* | 7/2008 | Krumel | .................. | H04L 29/06 370/351 |
| 7,558,875 B2* | 7/2009 | Zhang | .................... | H04L 41/12 709/238 |
| 7,788,522 B1* | 8/2010 | Abdelaziz | ............... | H04L 41/12 709/209 |
| 7,792,992 B2* | 9/2010 | Gnanasambandam | ...................... | H04L 67/104 709/225 |
| 7,881,223 B2* | 2/2011 | Shim | ....................... | H04L 12/42 370/254 |
| 7,953,858 B2* | 5/2011 | Xu | .......................... | H04L 29/06 709/227 |
| 8,051,161 B2* | 11/2011 | Hu | ........................ | H04L 67/104 709/223 |
| 8,126,849 B2* | 2/2012 | Schwan | .............. | G06F 11/2094 707/655 |
| 8,130,676 B2* | 3/2012 | Shim | ....................... | H04L 12/42 370/254 |
| 8,254,287 B2* | 8/2012 | Jayaram | .................. | H04L 45/00 370/254 |
| 8,281,023 B2* | 10/2012 | Dondeti | .............. | H04L 67/1076 709/227 |
| 8,346,882 B2* | 1/2013 | Berkey | ................. | H04L 67/104 709/209 |
| 8,352,585 B2* | 1/2013 | Hu | ........................ | H04L 67/104 709/223 |
| 8,407,283 B2* | 3/2013 | Le Scouarnec | ....... | H04L 67/104 709/203 |
| 8,458,254 B2* | 6/2013 | Yan | ......................... | H04L 45/64 455/453 |
| 8,484,382 B2* | 7/2013 | Das | ....................... | H04L 67/104 370/254 |
| 8,489,701 B2* | 7/2013 | Manion | ............... | H04L 12/4641 709/217 |
| 8,549,126 B2* | 10/2013 | Takeda | ................ | H04L 67/1065 370/390 |
| 8,605,721 B1* | 12/2013 | Chan | ................... | H04L 65/4076 370/390 |
| 8,713,194 B2* | 4/2014 | El-Beltagy | .......... | H04L 67/1078 709/201 |
| 8,792,331 B2* | 7/2014 | Schwan | ................ | H04L 67/104 370/216 |
| 8,806,250 B2* | 8/2014 | Gatta | .................... | G06F 1/3209 713/323 |
| 8,825,768 B2* | 9/2014 | Das | ....................... | H04L 67/104 370/254 |
| 8,848,513 B2* | 9/2014 | Das | ....................... | H04W 36/18 370/219 |
| 8,856,310 B2* | 10/2014 | Norden | ................... | A63F 13/12 709/224 |
| 9,049,660 B2* | 6/2015 | Thaler | .................... | H04L 12/12 |
| 9,100,933 B2* | 8/2015 | Takeda | ................ | H04L 67/1065 |
| 9,170,636 B2* | 10/2015 | Gatta | .................... | G06F 1/3209 |
| 9,264,498 B2* | 2/2016 | Das | ..................... | G06Q 30/0241 |
| 9,276,808 B2* | 3/2016 | Maenpaa | ........... | H04L 41/0677 |
| 9,294,379 B2* | 3/2016 | Thaler | .................... | H04L 12/12 |
| 9,294,994 B2* | 3/2016 | Yu | ....................... | H04W 52/0216 |
| 9,344,438 B2* | 5/2016 | Xiao | .................... | H04L 63/126 |
| 9,473,409 B2* | 10/2016 | Maenpaa | ........... | H04L 67/104 |
| 9,544,213 B2* | 1/2017 | Gatta | .................... | H04L 12/12 |
| 9,596,153 B2* | 3/2017 | Thaler | .................... | H04L 12/12 |
| 9,736,050 B2* | 8/2017 | Gatta | .................... | H04L 12/12 |
| 9,913,251 B2* | 3/2018 | Takeda | ................ | H04W 72/005 |
| 2002/0114341 A1* | 8/2002 | Sutherland | .............. | H04L 41/00 370/428 |
| 2003/0154238 A1* | 8/2003 | Murphy | .................. | H04L 41/00 709/201 |
| 2004/0085329 A1* | 5/2004 | Xu | ......................... | H04L 67/104 345/629 |
| 2004/0085912 A1* | 5/2004 | Xu | ......................... | H04L 45/04 370/254 |
| 2004/0143666 A1* | 7/2004 | Xu | ......................... | H04L 29/06 709/227 |
| 2005/0060406 A1* | 3/2005 | Zhang | .................... | H04L 41/12 709/225 |
| 2006/0021054 A1* | 1/2006 | Costa | .................... | G06F 21/566 726/25 |
| 2006/0031933 A1* | 2/2006 | Costa | .................... | G06F 21/552 726/22 |
| 2007/0006314 A1* | 1/2007 | Costa | .................... | G06F 21/554 726/25 |
| 2007/0149279 A1* | 6/2007 | Norden | ................... | A63F 13/12 463/29 |
| 2007/0230482 A1* | 10/2007 | Shim | ....................... | H04L 12/42 370/400 |
| 2007/0288638 A1* | 12/2007 | Vuong | .................. | H04L 67/104 709/226 |
| 2008/0130516 A1* | 6/2008 | You | ....................... | H04L 67/104 370/254 |
| 2008/0151801 A1 | 6/2008 | Mizuta | | |
| 2008/0172465 A1* | 7/2008 | Kim | ....................... | H04L 67/104 709/205 |
| 2008/0183853 A1* | 7/2008 | Manion | ............... | H04L 12/4641 709/223 |
| 2008/0209053 A1* | 8/2008 | Shen | ........................ | H04L 29/06 709/228 |
| 2008/0209054 A1* | 8/2008 | Zhang | .................... | H04L 29/06 709/228 |
| 2008/0294779 A1* | 11/2008 | Gkantsidis | ............ | H04L 67/104 709/226 |
| 2009/0034432 A1* | 2/2009 | Bonta | ................... | H04W 74/02 370/255 |
| 2009/0103702 A1* | 4/2009 | Allen | ................... | H04L 9/3236 379/142.04 |
| 2009/0116484 A1* | 5/2009 | Buford | .................. | H04L 45/00 370/392 |
| 2009/0300215 A1* | 12/2009 | Gnanasambandam | ...................... | H04L 67/104 709/242 |
| 2009/0310518 A1* | 12/2009 | Jayaram | .................. | H04L 45/00 370/254 |
| 2009/0323696 A1* | 12/2009 | Schwan | ................ | H04L 67/104 370/395.31 |
| 2009/0327364 A1* | 12/2009 | Schwan | .............. | G06F 11/2094 |
| 2010/0064008 A1* | 3/2010 | Yan | ......................... | H04L 45/64 709/204 |
| 2010/0125670 A1* | 5/2010 | Dondeti | ................ | H04L 67/104 709/229 |
| 2010/0146092 A1* | 6/2010 | Hu | ........................ | H04L 67/104 709/223 |
| 2010/0161817 A1* | 6/2010 | Xiao | .................... | H04L 63/126 709/229 |
| 2010/0287272 A1* | 11/2010 | Berkey | ................. | H04L 67/104 709/223 |

(56) References Cited

U.S. PATENT DOCUMENTS

| | | | | |
|---|---|---|---|---|
| 2010/0312622 | A1* | 12/2010 | Das | G06Q 30/0241 705/14.4 |
| 2010/0332683 | A1* | 12/2010 | Das | H04L 67/104 709/249 |
| 2011/0060843 | A1* | 3/2011 | Shim | H04L 12/42 709/238 |
| 2011/0078439 | A1* | 3/2011 | Mao | H04L 63/126 713/156 |
| 2011/0161417 | A1* | 6/2011 | Le Scouarnec | H04L 67/104 709/204 |
| 2011/0173305 | A1* | 7/2011 | Matuszewski | H04L 45/02 709/221 |
| 2011/0205949 | A1* | 8/2011 | Maenpaa | H04W 40/005 370/311 |
| 2011/0205960 | A1* | 8/2011 | Wu | H04L 45/64 370/328 |
| 2011/0211444 | A1* | 9/2011 | Das | H04W 36/18 370/219 |
| 2011/0252122 | A1* | 10/2011 | Takeda | H04L 67/1065 709/223 |
| 2011/0307538 | A1* | 12/2011 | Rimac | H04L 29/08846 709/202 |
| 2012/0030333 | A1* | 2/2012 | Hu | H04L 67/104 709/223 |
| 2013/0007442 | A1* | 1/2013 | Mao | H04L 63/0823 713/156 |
| 2013/0132602 | A1* | 5/2013 | El-Beltagy | H04L 67/1078 709/231 |
| 2013/0282831 | A1* | 10/2013 | Das | H04L 67/104 709/205 |
| 2013/0315092 | A1* | 11/2013 | Yu | H04W 52/0216 370/252 |
| 2014/0016471 | A1* | 1/2014 | Maenpaa | H04L 67/104 370/235 |
| 2014/0169254 | A1* | 6/2014 | Takeda | H04L 67/1065 370/312 |
| 2014/0355413 | A1* | 12/2014 | Maenpaa | H04L 41/0677 370/217 |
| 2015/0229726 | A1* | 8/2015 | Jimenez | H04W 4/18 709/227 |
| 2015/0341906 | A1* | 11/2015 | Takeda | H04L 67/1065 370/312 |

OTHER PUBLICATIONS

Basagni, S. et al., "A Generalized Clustering Algorithm for Peer-to-Peer Networks", Workshop on Algorithmic Aspects of Communication, Jan. 1, 1997, pp. 1-15, obtained on Jun. 29, 2015, obtained from Internet: http://citeseerx.ist.psu.edu/viewdoc/download?doi=10.1.1.24.145&rep=rep1&type=pdf.

Li.,C. et al., "An Energy-Efficient Unequal Clustering Mechanism for Wireless Sensor Networks", IEEE International Conference on Mobile Adhoc and Sensor Systems, Nov. 7, 2005, pp. 1-8, IEEE.

Chen, B., et al., "Span: An Energy-Efficient Coordination Algorithm for Topology Maintenance in Ad Hoc Wireless Networks", Wireless Networks, Sep. 1, 2002, vol. 8, Issue 5, pp. 481-494, obtained on Jun. 29, 2015, obtained from internet: http://pdos.csail.mit.edu/~benjie/papers/mobicom01/span:mobicom01.pdf.

Ali. M., et al., "A Case for Peer-to-Peer Network Overlays in Sensor Networks", International Workshop on Wireless Sensor Network Architecture (WWSNA'07), Sep. 10, 2007, pp. 56-61, Cambridge, Massachusetts, US, obtained on Jun. 29, 2015, obtained from internet: http://www.st.ewi.tudelft.nl/~koen/papers/WWSNA.pdf.

Chinara, S. et al., "Energy Efficient Mobility Adaptive Distributed Clustering Algorithm for Mobile Ad Hoc Network", 16th International Conference on Advanced Computing and Communications, Dec. 14, 2008, pp. 265-272, IEEE.

Segawa, O., et al., "Web Annotation Sharing using P2P", Proceedings of the 15th international conference on World Wide Web, May 23, 2006, pp. 851-852, ACM, New York.

Kim, K. T., et al., "An Energy Efficient Routing Protocol in Wireless Sensor Networks", International Conference on Computational Science and Engineering, vol. 1, Aug. 29, 2009, pp. 132-139, IEEE.

Li, L., et al., "Different types of nodes in P2PSIP", P2PSIP Working Group Internet-Draft, Nov. 22, 2007, pp. 1-12, IETF.

Jimenez, J., et al., "A Constrained Application Protocol (CoAP) Usage for REsource LOcation and Discovery (RELOAD)", P2PSIP Internet-Draft, Aug. 20, 2012, pp. 1-18, IETF.

Jennings, C., et al., "REsource LOcation and Discovery (RELOAD) Base Protocol", P2PSIP Internet-Draft, Nov. 5, 2012, pp. 1-167, IETF.

Jennings, C., et al., "A SIP Usage for RELOAD", P2PSIP Internet-Draft, Jan. 17, 2012, pp. 1-13, IETF.

Stoica, I., et al., "Chord: A Scalable Peer-to-Peer Lookup Protocol for Internet Applications", IEEE/ACM Transactions on Networking, Jan. 2, 2003, pp. 17-32, vol. 11, Issue: 1, IEEE.

* cited by examiner

CONNECTION MECHANISM FOR ENERGY-EFFICIENT PEER-TO-PEER NETWORKS

TECHNICAL FIELD

Disclosed herein are embodiments of a communications network and corresponding methods and devices, in particular a peer-to-peer network comprising and interconnecting different types of nodes.

BACKGROUND

The Internet of Things (IoT) envisions a fully networked world with billions of interconnected devices. Most of these devices will be sensors and actuators that will provide ubiquitous sensing capabilities and interaction with the physical world. This will lead to a dramatic paradigm shift in the networking world, since Machine-to-Machine (M2M) communications will be several orders of magnitude greater than the Human-to-Human or Human-to-Machine communications that are the norm nowadays.

A large portion of these sensors are expected to be small, inexpensive, wireless and powered by batteries in order to be placed wherever needed. Therefore, in order to save battery, those sensor devices will be sleeping most of the time and will only awake periodically to sense their environment and send their measurements or to receive new instructions. Actuators, on the other hand, are expected to receive power from a power grid and they are thus awake most of the time waiting for commands, but they will still be resource-constrained devices. It would generally be desirable to allow such sensors and actuators to be part of a Peer-to-Peer (P2P) network.

Recently protocols for establishing P2P networks of computing devices in the context of IoT/M2M networks have been proposed. One such protocol is the REsource LOcation And Discovery (RELOAD) protocol, see e.g. the internet draft "A Constrained Application Protocol (CoAP) Usage for REsource Location And Discovery (RELOAD)" of Aug. 20, 2012 by J. Jimenez, J. Lopez-Vega, J. Maenpaa and G. Camarillo, available online at: http://tools.ietf.org/html/draft-jimenez-p2psip-coap-reload-02, or the internet draft "Resource Location And Discovery Base Protocol" of Nov. 5, 2012 by C. Jennings, B. B. Lowekamp, E. K. Rescorla, S. A. Baset, and H. G. Schulzrinne, available online at http://tools.ietf.org/html/draft-ietf-p2psip-base-23.

RELOAD is a generic P2P signalling protocol that uses the Chord algorithm (see e.g. Stoica, I., Morris, R., Liben-Nowell, D., Karger, D., Kaashoek, M., Dabek, F., and H. Balakrishnan, "Chord: A Scalable Peer-to-peer Lookup Protocol for Internet Applications", IEEE/ACM Transactions on Networking Volume 11, Issue 1, 17-32, February 2003) as the default Distributed Hash Table (DHT) algorithm to organize participating nodes in a P2P overlay network. A distributed hash table stores key-value pairs by assigning keys to different nodes; a node will store the values for all the keys for which it is responsible. Chord specifies how keys are assigned to nodes, and how a node can discover the value for a given key by first locating the node responsible for that key. RELOAD provides a generic, self-organizing P2P overlay network service. Nodes can use the overlay to route messages to other nodes, as well as to store and retrieve data. The RELOAD protocol provides different types of nodes: A first type of nodes, referred to as peers, and a second type of nodes, referred to as clients. While peers route RELOAD messages and store information, clients are RELOAD nodes that do not have routing or storage responsibilities. However, clients do share some characteristics with peers since they use the same protocol and even implementation in most cases. In particular, like peers, clients are identified by their node-ID and they use certificates to store data at certain locations in the overlay.

Hence, a network employing the RELOAD protocol is an example of a P2P network that allows resource-constrained devices such as sensors to connect as clients, thus requiring lower computational and data communications capabilities than for peers. However, there may be situations where a battery-powered or otherwise resource-constrained device cannot connect to a P2P network as a client, e.g. because its admitting peer does not have any more resources. In prior art P2P networks, e.g. networks using the RELOAD protocol, the only solution for such a device is to connect as a full peer, and therefore being awake all the time in order to receive and process RELOAD messages from other peers and clients. This will quickly exhaust its resources, requiring frequent battery replacements. Conversely, allowing IoT sensors to periodically join and leave the overlay network as peers in order to sleep would mean an order of magnitude more churn, leading to a huge number of topology changes and thus signalling messages in the overlay network.

Consequently, it remains desirable to provide communications networks and/or processes related to such networks that allow resource-constrained devices to more efficiently connect to such networks while maintaining their power consumption and/or other resource usage at a low level. Examples of other resource usage may include computational resources, memory resources and data communications resources.

SUMMARY

There is provided a method for a processing device in a system of a plurality of processing devices communicatively connected via a peer-to-peer overlay network; wherein any processing device is configured to connect to the peer-to-peer overlay network as a peer node or as a client node, that is, being a peer node or a client node; wherein a client node is connectable to the peer-to-peer overlay network via a peer node. The method comprises, the steps of the processing device sending a connection request to a peer node, the connection request comprising an indication that said processing device wants to attach as a client node.

There is further provided a method for a processing device in a system of a plurality of processing devices communicatively connected via a peer-to-peer overlay network; wherein any processing device is configured to connect to the peer-to-peer overlay network as a peer node or as a client node, that is, being a peer node or a client node; wherein a client node is connectable to the peer-to-peer overlay network via a peer node.

The method comprises for the processing device being a peer node when receiving a connection request comprising an indication that another processing device wants to attach as a client node, determining, whether the processing device can admit further connections of client nodes; and—responsive to the connection request, returning a rejection message to said another processing device, if the processing device receiving the connection request cannot admit further connections of client nodes.

According to an embodiment of the invention there is further provided a method for a processing device in a system of a plurality of processing devices communicatively connected via a peer-to-peer overlay network; wherein any processing device is configured to connect to the peer-to-peer overlay network as a peer node or as a client node, that is, being a peer node or a client node; wherein a client node is connectable to the peer-to-peer overlay network via a peer node;

The method comprises forming one of the nodes of a cluster and perform a cluster head role connecting the cluster to the peer-to-peer overlay network, the processing device thereby acting as a peer, while other cluster nodes, are attached to the cluster head as clients, and wherein the processing device, as cluster head role, transferring the cluster head role to another node of the cluster, such that the cluster head role is handed over from one node to another among the nodes in the cluster.

In addition to the methods above, corresponding processing devices are provided.

A processing device in a system of a plurality of processing devices communicatively connected via a peer-to-peer overlay network; wherein any processing device is configured to connect to the peer-to-peer overlay network as a peer node or as a client node, that is, being a peer node or a client node; wherein a client node is connectable to the peer-to-peer overlay network via a peer node;

The processing device comprises a processing circuit; network interface circuitry connected to the processing circuit and a memory, said memory containing instructions executable by said processor, whereby the processing device is being operable to sending a connection request to a peer node, the connection request comprising an indication that said processing device wants to attach as a client node.

A processing device in a system of a plurality of processing devices communicatively connected via a peer-to-peer overlay network; wherein any processing device is configured to connect to the peer-to-peer overlay network as a peer node or as a client node, that is, being a peer node or a client node; wherein a client node is connectable to the peer-to-peer overlay network via a peer node; the processing device comprising a processing circuit; network interface circuitry connected to the processing circuit and a memory, said memory containing instructions executable by said processor, whereby the processing device being operable to, when being a peer node, when receiving a connection request comprising an indication that another processing device wants to attach as a client node.

determining, whether the processing device can admit further connections of client nodes; and responsive to the connection request, returning a rejection message to said another processing device, if the processing device receiving the connection request cannot admit further connections of client nodes.

A processing device in a system of a plurality of processing devices communicatively connected via a peer-to-peer overlay network; wherein any processing device is configured to connect to the peer-to-peer overlay network as a peer node or as a client node, that is, being a peer node or a client node; wherein a client node is connectable to the peer-to-peer overlay network via a peer node. The processing device comprising a processing circuit; network interface circuitry connected to the processing circuit and a memory, said memory containing instructions executable by said processor, the processing device being operable to form one of the nodes of a cluster and being operable to perform a cluster head role connecting the cluster to the peer-to-peer overlay network, the processing device thereby acting as a peer, while other cluster nodes, are attached to the cluster head as clients, and wherein the processing device, as cluster head role, is configured to transfer the cluster head role to another node of the cluster, such that the cluster head role is handed over from one node to another among the nodes in the cluster.

For the processing devices of some embodiments it applies that they are used in a system of a plurality of processing devices communicatively connected via a peer-to-peer overlay network; wherein any processing device is configured to connect to the peer-to-peer overlay network as a peer node or as a client node, that is, being a peer node or a client node; wherein a client node is connectable to the peer-to-peer overlay network via a peer node. A processing device comprises a processing circuit; network interface circuitry connected to the processing circuit and a memory, said memory containing instructions executable by said processor.

Described herein are also embodiments of a communications system that comprise a plurality of nodes which are communicatively connected via a communications network. Each node may comprise a processing circuit and network interface circuitry connected to the processing circuit, and each node is configured to connect to the communications network and to communicate with other nodes of the communications network.

Consequently, embodiments of the communications system disclosed herein provide a clustering-based mechanism for resource-constrained devices that increases the energy efficiency of a P2P overlay network. Embodiments of the communications system facilitate battery-powered or otherwise resource-constrained processing devices to connect to the overlay network even if they are in a sleeping mode most of the time, and to share the burden of being a peer of the network (i.e. of being awake) among the members of a cluster.

In particular, embodiments of the communications system disclosed herein allow battery-powered nodes that cannot attach as clients, e.g. because their admitting peer already has too many clients or because there are no permanent peers at all, to group together in a cluster that may behave as a single peer for the rest of the overlay. In some embodiments, only a single node of each cluster performs the role of the cluster head.

For the purpose of the present description, the terms "sleep" and "asleep" are intended to refer to a node being in an energy-conserving state, while the term "awake" is intended to refer to a node being in an operational state involving a higher consumption of energy and/or other resources than the energy-conserving state. For example, being awake may comprise being fully operational and performing all functions of a peer in the overlay network and/or other functions which the node is configured to perform. Being asleep may comprise pausing all activities other than those required to be able to re-enter the normal operational state (i.e. entering the awake state) at a predetermined point in time; hence, while being asleep, the node may still operate some basis processes such as a timer.

In some embodiments, the plurality of nodes comprises at least a first type of nodes and a second type of nodes, each node of the second type being operable to connect to the communications network via an admitting node of the first type. In particular, the first type of nodes may be peers of a peer-to-peer overlay network, and the second type of nodes may be client nodes connectable to the peer-to-peer overlay network via a peer node of the peer-to-peer overlay network. In some embodiments, the cluster head node may thus join the overlay network as a peer, while the other members of the cluster are connected to the cluster head as clients, and thus are able to sleep most of time.

For the purpose of the present description, the term peer is intended to refer to a node in the communications network that is configured to route messages to and/or from nodes other than those to which it is directly connected. In some embodiments, a peer is also configured to store data related to the communications network. In general, a P2P network may provide a generic distributed storage service which may allow the storage of any data or at least certain types of data in a distributed manner. Hence, records that may otherwise be centrally stored in a database may be stored in a distributed manner among the peers of the P2P network. That is, each peer may store zero or more records. An example of such data is the storage of a record that contains a Session Initiation Protocol (SIP) Uniform Resource Identifier (URI) and its associated node-ID. Such a usage is described in the internet draft "A SIP Usage for RELOAD", by Jennings, C., Lowekamp, B., Rescorla, E., Baset, S., and H. Schulzrinne, January 2012, available at http://tools.ietf.org/html/draft-ietf-p2psip-sip-07. In this example, a node can look up a SIP URI and get back the node-ID of the node that corresponds to that SIP URI.

For the purpose of the present description, the term client is intended to refer to a node that does not have routing or storage responsibilities in respect of the communications network.

In order to balance the energy burden, the role of being the cluster head is shared by all nodes in the cluster. To this end, in some embodiments, the cluster is operable to maintain a cluster head schedule indicative of information about which node is to take over the cluster head role at what point in time. Hence, a cluster node only acts as the cluster head node during a certain amount of time. Then, another node of the cluster becomes the new cluster head. For the purpose of the present description, the process for transferring the cluster head role from one node of the cluster to another node of the cluster will also be referred to as cluster head handover.

In some embodiments, each node of the communications network is identifiable to other nodes of the communications network by a node identifier. The mechanism for transferring the cluster head role may thus comprise a mechanism for sharing, among the nodes of the cluster, a cluster node identifier for identifying the cluster as a node of the communications network; wherein the cluster is identifiable by the same cluster node identifier before and after a transfer of the cluster head role from one node of the cluster to another node of the cluster. Hence, in order to avoid churn and minimize the number of signalling messages in the overlay, all cluster head nodes may share the same node-ID. Therefore, a cluster head handover is seen from outside the cluster just as one peer changing its network address (e.g. its IP address and port).

In some embodiments all communications within the cluster, i.e. between members of the cluster, including cluster head handovers, may employ standard messages of an existing protocol for communication within the communications network, without requiring introduction of additional types of message. For example, in the context of RELOAD, all communications within a cluster may be implemented with existing RELOAD messages.

Nevertheless, in some embodiments, it is beneficial to introduce one or more mechanisms for coordinating the actions of the cluster members. In some embodiments, the cluster maintains information about the nodes being part of the cluster and to synchronize them, in particular to synchronize at which point in time which cluster node is to take over the cluster head role. To this end, the information may be indicative of (i.e. at least be sufficient for a cluster node to determine) the point in time when each of the nodes of the cluster is scheduled to take over the cluster head role, thus allowing each node to determine when it has to wake up from a sleeping mode. As this information may conveniently be stored in the form of a table, this information will, for the purpose of the present description, also be referred to as a cluster table. It will be understood, however, that the information may also be stored in a different format other than a table format. The cluster table may be stored in the memory of one, more or all of the cluster members so as to provide access to the stored information to all cluster members. In some embodiments the cluster table comprises the cluster head schedule described above and in the following. Alternatively, the cluster head schedule may be stored in a separate data structure. Creating a new cluster may thus comprise making the cluster table available to at least the members of the cluster, e.g. by creating a suitable network resource.

In some embodiments, the cluster may have stored a private key of a cluster head certificate in order to provide protection of authenticity and/or confidentiality of the communication between the cluster and other nodes of the communications network. The private key will also be referred to as the cluster key; it may be stored in a memory of one, some or all members of the cluster. In some embodiments, the cluster key is stored as a special resource that is not shared with other nodes outside the cluster.

According to an aspect, the plurality of nodes comprise at least a first type of nodes and a second type of nodes, each node of the second type being operable to connect to the communications network via a node of the first type; wherein a node of the second type is operable to send a connection request to an admitting node of the first type, the connection request comprising an indication that the requesting node is a node of the second type; and wherein the admitting node is operable to determine whether the admitting node can admit further connections of nodes of the second type, and, responsive to the connection request, to return a rejection message to the requesting node, if the admitting node cannot admit further connections of nodes of the second type.

Consequently a mechanism is provided to explicitly limit the number of clients per peer. It will be appreciated that embodiments of the mechanism disclosed herein may be used to reject a connection from a client (i.e., a node that wants to connect to the overlay as a client) and/or to reject a finger connection, i.e. a connection from a node that is already in the overlay and wants to connect with a peer node. The current RELOAD protocol specification only provides a "clients-permitted" field of the overlay configuration file so as to allow specifying whether nodes of the client type are permitted at all in a given network, or whether all nodes must be peers. However, the prior art RELOAD specifications provide no way for the overlay to enforce this. The inventors have realized that a more efficient management of clients in a peer-to-peer network may be achieved when the network facilitates peers to determine whether a new node that attempts to connect to the network by attaching to said peer is a client or a new peer. In the context of the prior art RELOAD specification, the only difference between an attachment to a node by a client and a peer is that peers will perform a join operation at a later point in time. Hence, in a prior art RELOAD system, once a limit for the number of clients is reached, the only way of rejecting clients is to cut the connection to a newly attached node after waiting some time for the missing join operation, since rejecting new attaching nodes from the outset would also impede new peers joining the network. Embodiments of an aspect of the system disclosed herein, on the other hand, provides an efficient mechanism that allows a peer to identify clients when they attach, and to selectively reject clients if the peer does not have enough resources.

The connection request may be an attachment request establishing a direct connection between the requesting node with an admitting node of an overlay network so that they can exchange direct messages, as opposed to exchanges of messages through the communications network traversing multiple nodes of the overlay network. Hence exchanging a direct message between nodes of an overlay network is intended to refer a message not traversing any other overlay node; nevertheless, the message may likely traverse a set of network routers or other nodes of the underlying network, other than overlay nodes.

According to a further aspect, a more efficient mechanism for connecting nodes of a client type is provided. According to this aspect, the plurality of nodes comprise at least a first type of nodes and a second type of nodes, each node of the second type being operable to connect to the communications network via an admitting node of the first type, the admitting node being operable to send recurring update messages to the nodes of the second type connected to it; and wherein said node of the second type is operable to send a message to the admitting node indicative of a request not to receive any recurring update messages; and wherein the admitting node is operable, responsive to receiving said message, to not send recurring update messages to said node of the second type.

Hence, a mechanism is provided that allows a client node to avoid the need for receiving continuous updates from other nodes in the overlay, thus allowing the client node to be in an energy-saving state, e.g. a sleeping mode, without participating in the overlay routing. The recurring update messages are update messages that are sent at certain regular or irregular time intervals, e.g. periodically. The content of the update message may vary from time to time. In the prior art RELOAD specification, clients receive periodic and asynchronous updates from the admitting peer they are connected to. Even though clients can mark the "send_update" flag of an Attach Request message as FALSE, this only disables the sending of an immediate update. Periodic stabilization procedures in the overlay continue and the client would keep receiving periodic updates, thus consuming bandwidth and energy of both, the admitting peer and its clients. Moreover, embodiments of a communication network disclosed herein avoid undesired errors caused by clients being in a sleeping node when an admitting peer attempts to send an updated message to the client. Such a failed attempt may otherwise cause a connection error in the admitting peer, thus possibly causing the peer to assume that the client is gone and to delete the client from its list of clients.

The inventors have realized that, since clients do not participate in routing, the only purpose of these update messages is to allow clients to know if there is a better admitting peer for them. However sleeping or intermittent-connected clients may use other mechanisms (e.g. Ping or RouteQuery mechanisms) to identify this situation the next time they contact its admitting peer.

In some embodiments, each node of the second type is operable to connect to the communications network by attaching to an admitting node of the first type so as to allow the node of the second type and the admitting node to exchange direct messages, as opposed to exchanges of messages through the communications network traversing multiple nodes. The admitting node may thus be operable to send recurring update messages to the nodes of the second type attached to it; and wherein said node of the second type is operable to send a message to the admitting node indicative of a request not to receive any recurring update messages; and wherein the admitting node is operable, responsive to receiving said message, to not send recurring update messages to said node of the second type.

In some embodiments, the message indicative of a request not to receive any recurring update messages may be a request for attaching to a node of the network, i.e. the request not to receive updated messages may be included in the attach request, e.g. as a flag or other suitable indication. Alternatively, the indication may be included in a separate message different from an attach message. In some embodiments, the node of the second type may be operable to send a message to the admitting node indicative of a request to resume recurring update messages.

In some embodiments, the communications network is an overlay network, i.e. a network of nodes which is built on the top of another network. Nodes in the overlay can be thought of as being connected by virtual or logical links, each of which corresponds to a path. The nodes of the overlay may be represented by a graph. In some embodiments, each node in the overlay is assigned a node identifier which, together with an overlay algorithm, determines its position in the graph and the set of nodes it connects to. An example of a P2P overlay network is a P2P overlay network using a distributed hash table. The underlying network may be any suitable computer network, such as a wide area computer network, e.g. the Internet or another computer network implementing an Internet Protocol. In some embodiments, the network overlay implements a Peer-to-Peer (P2P) signalling protocol for use on the underlying computer network such as the Internet. The P2P signalling protocol provides its nodes with a storage and messaging service between a set of cooperating peers that form the overlay network. An example of such a P2P signalling protocol is RELOAD, see the internet draft "Resource Location And Discovery Base Protocol" of Nov. 5, 2012 by C. Jennings, B. B. Lowekamp, E. K. Rescorla, S. A. Baset, and H. G. Schulzrinne, available online at http://tools.ietf.org/html/draft-ietf-p2psip-base-23. In some embodiments, the nodes of the P2P overlay network and, in particular the nodes of a cluster, may be located at relatively large distances from each other, e.g. many kilometers.

Each node of the network may be a computer or other processing device comprising a processing circuit and interface circuitry for connecting the node to the communications network, e.g. via a wired or wireless connection. Sensors are examples of such nodes that are designed to sense or monitor one or more physical quantity, such as temperature, humidity, concentration of one or more component, electrical quantities, strain, positions, velocity, acceleration, radiation, etc. Such sensors may be configured to implement low consumption modes of operation so as to allow the sensor to be partially or completely autonomous and battery powered over a considerable lifetime depending on the duty cycle and the communications resources used. Actuators are examples of nodes that are operable to act upon an environment. For example, an actuator can be a motor that produces movement upon receiving a command over a network.

For the purpose of the present description, the term "attaching" a node to a node of the communications network is intended to refer to any suitable procedure for establishing a direct connection with another node so that they can exchange direct messages, as opposed to exchanges of messages through the communications network traversing multiple nodes. When a client node is attached to a peer, the client may thus communicate with other nodes of the network via said peer. A "join" operation may be used by a node to join an overlay as a peer. When the node joins the overlay as a peer, it will be responsible to manage a part of the overlay. The term "connecting" to a communications network is intended to refer to any suitable registration procedure for registering a node with a communications network such as a P2P overlay network, so as to allow the node communicate with the other nodes of the communications network.

Disclosed herein are different aspects including the communications system described above and in the following, corresponding methods, apparatus, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

According to one aspect, disclosed herein is a method for connecting a processing device to a communications system as a node of the communications system; the method comprising:
forming at least one cluster of nodes,
assigning a cluster head role to one of the nodes of the cluster;
connecting the cluster to the communications network via said cluster head node, and
implementing a mechanism for transferring the cluster head role from one node of the cluster to another node of the cluster.

According to another aspect, disclosed herein is a method for connecting a processing device to a communications system as a node of the communications system, each node of the communications system being configured to connect to the communications network as a first type of node or as a second type of node, each node of the second type being operable to connect to the communications network via a node of the first type; the method comprising:
sending a connection request to an admitting node of the first type, the connection request comprising an indication that the requesting node is a node of the second type;
determining, by the admitting node, whether the admitting node can admit further connections of nodes of the second type, and
responsive to the connection request, returning a rejection message by the admitting node to the requesting node, if the admitting node cannot admit further connections of nodes of the second type.

According to yet another aspect, disclosed herein is a method for connecting a processing device to a communications system as a node of the communications system, each node of the communications system being configured to connect to the communications network as a first type of node or as a second type of node, each node of the second type being operable to connect to the communications network via an admitting node of the first type; the method comprising:
sending, by an admitting node, recurring update messages to the nodes of the second type connected to it;
receiving, by the admitting node, from one of the nodes of the second type connected to it, a message indicative of a request not to receive any recurring update messages; and
responsive to the received message, omitting sending recurring update messages to said node of the second type from which the message has been received.

In some embodiments the connection is an attachment of the processing device to the admitting node, and a connection request is an attach request requesting attachment of the processing device to the admitting node.

The features of embodiments of the methods described herein may be implemented in software and carried out on a processing device or other data processing system caused by the execution of computer-executable instructions. The instructions may be program code means loaded in a memory, such as a Random Access Memory (RAM), from a storage medium or from another computer via a computer network. Alternatively, the described features may be implemented by hardwired circuitry instead of software or in combination with software.

According to yet another aspect, disclosed herein is a processing device for use as a node in a communications system, the communications system comprising a plurality of nodes communicatively connected via a communications network, the processing device comprising a processing circuit and network interface circuitry connected to the processing circuit; the processing device being configured to connect to the communications network and to communicate with other nodes of the communications system, the communications system comprising at least one cluster of nodes, wherein the processing device is operable to connect to the communications system as a member of said cluster; and to perform a cluster head role connecting the cluster to the communications network, and wherein the processing device is operable to transfer the cluster head role to another node of the cluster according to a mechanism for transferring the cluster head role.

In some embodiments, the processing device comprises a memory having stored thereon a node identifier for identifying the processing device within the communications system. In some embodiments the memory has stored thereon a private node identifier for identifying the processing device to other members of the cluster, and a public node identifier for identifying the cluster within the communications system. Hence, in some embodiments, the public node identifier of the processing device that initiates a new cluster, i.e. the initial node of the cluster, is used as a cluster node identifier for identifying the cluster in the communications network.

In some embodiments, the processing device may have stored thereon a respective cryptographic key associated with each node identifier. Creating a new cluster may comprise making the cryptographic key associated with the public node identifier of the processing device that creates the new cluster available to other members of the cluster without making said cryptographic key available to other nodes of the communications network that are not members of the cluster.

According to yet another aspect, disclosed herein is a processing device for use as a node in a communications system, the communications system comprising a plurality of nodes communicatively connected via a communications network, the processing device comprising a processing circuit and network interface circuitry connected to the processing circuit; the processing device being configured to connect to the communications network and to communicate with other nodes of the communications system, each node of the communications system being configured to connect to the communications network as a first type of node or as a second type of node, each node of the second type being operable to connect to the communications network via a node of the first type; the processing device being operable to send a connection request to an admitting node of the first type, the connection request comprising an indication that the processing device is a node of the second type, and receiving, from the admitting node a response, indicative of a result of a determination, by the admitting node, whether the admitting node can admit further connections of nodes of the second type.

According to yet another aspect, disclosed herein is a processing device for use as a node in a communications system, the communications system comprising a plurality of nodes communicatively connected via a communications network, the processing device comprising a processing circuit and network interface circuitry connected to the processing circuit; the processing device being configured to connect to the communications network and to communicate with other nodes of the communications system, each node of the communications system being configured to connect to the communications network as a first type of node or as a second type of node, each node of the second type being operable to connect to the communications network via a node of the first type; the processing device being operable:
- to connect to the communications network as a node of the first type,
- to receive a connection request, the connection request comprising an indication that another processing device requests connection to the communications network as a node of the second type,
- to determine, whether the processing device can admit further connections of nodes of the second type; and responsive to the connection request, to return a rejection message to said another processing device, if the processing cannot admit further connections of nodes of the second type.

According to yet another aspect, disclosed herein is a processing device for use as a node in a communications system, the communications system comprising a plurality of nodes communicatively connected via a communications network, the processing device comprising a processing circuit and network interface circuitry connected to the processing circuit; the processing device being configured to connect to the communications network and to communicate with other nodes of the communications system, each node of the communications system being configured to connect to the communications network as a first type of node or as a second type of node, each node of the second type being operable to connect to the communications network via a node of the first type; the processing device being operable:
- to connect to the communications network as a node of the first type,
- to send recurring update messages to nodes of the second type connected to it;
- to receive, from one of the nodes of the second type connected to it, a message indicative of a request not to receive any recurring update messages; and responsive to the received message, to omit sending recurring update messages to said node of the second type from which the message has been received.

According to yet another aspect, disclosed herein is a processing device for use as a node in a communications system, the communications system comprising a plurality of nodes communicatively connected via a communications network, the processing device comprising a processing circuit and network interface circuitry connected to the processing circuit; the processing device being configured to connect to the communications network and to communicate with other nodes of the communications system, each node of the communications system being configured to connect to the communications network as a first type of node or as a second type of node, each node of the second type being operable to connect to the communications network via a node of the first type; the processing device being operable:
- to connect, via an admitting node, to the communications network as a node of the second type,
- to send, to the admitting node, a message indicative of a request not to receive any recurring update messages so as to cause the admitting node to omit sending recurring update messages to the processing device.

Generally, the network interface circuitry may be any circuitry or device configured to provide communication with a communications network, e.g. a wireless or wired communications network.

The processing circuit may be any circuitry or device configured to perform data processing, e.g. a suitably programmed microprocessor, a Central Processing Unit (CPU) of a computer, of a handheld terminal, or of another processing device, a dedicated hardware circuit, etc., or a combination of the above. The processing device may comprise a memory or other suitable storage medium having computer program code stored thereon adapted to cause, when executed by the processing circuit, the processing device to perform the steps of embodiments of the method described herein.

Examples of a processing device include User Equipment (UE) such as a mobile phone, smart phone, or another suitable wireless communications device, a computer, a sensor, an actuator, etc. or combinations thereof.

BRIEF DESCRIPTION OF THE DRAWINGS

The above and/or additional objects, features and advantages of embodiments of the methods, systems and devices disclosed herein, will be further elucidated by the following illustrative and non-limiting detailed description of embodiments of the methods, systems and devices disclosed herein, with reference to the appended drawings, wherein.

DETAILED DESCRIPTION

In the following description, reference is made to the accompanying figures, which show by way of illustration how embodiments of the methods, systems and devices disclosed herein may be practiced.

Figure 1:
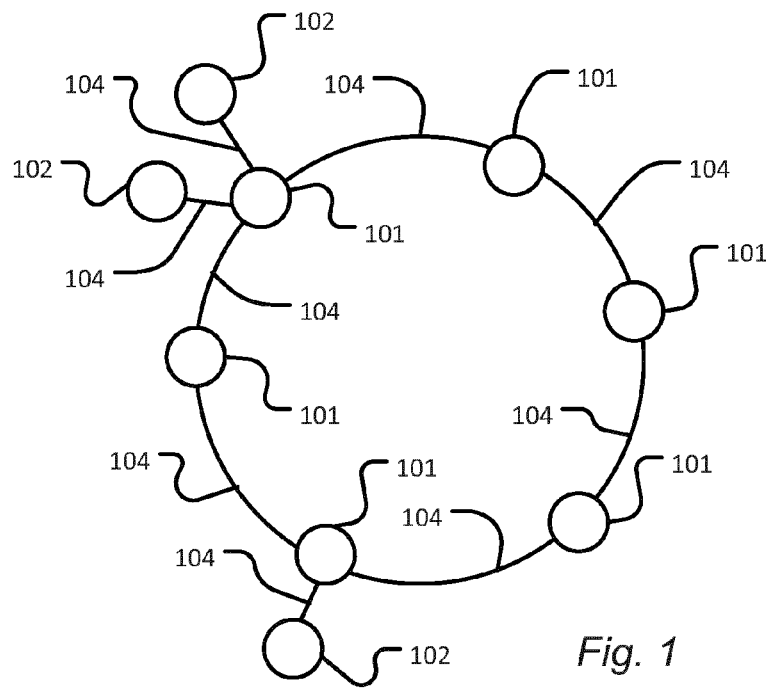
FIG. 1 schematically illustrates parts of an embodiment of a communications system.

FIG. 1 schematically illustrates parts of an embodiment of a communications system, in particular parts of a P2P overlay network of an underlying communications system. The system comprises processing devices 101, 102, connected to the overlay network as nodes of the overlay network. The nodes are connected to one another by logical links 104 so as to form the topology of the overlay network. It will be appreciated that each link may be implemented by a communications path of the underlying communications network where the path may involve a direct connection between two nodes or it may involve multiple entities of the underlying communications network.

The overlay network comprises a first type of nodes 101, also referred to as peers. Peers 101 and their interconnecting links 104 define the overall topology of the network and the peers 101 participate in the routing of messages between nodes other than messages to from nodes to which a peer is directly connected. The peers further provide storage capacity for information related to the overlay network, such as routing information, network directories, etc.

The overlay network further comprises a second type of nodes 102, also referred to as clients. Each client 102 is connected to the overlay network via an admitting peer 101. Hence, a client only participates in the routing of messages directed to it or originating from it.

In the example of FIG. 1, the peers are arranged in a ring-shaped topology, e.g. using the Chord protocol. The arrangement of nodes and links, as well as the routing and storage tasks to be performed by the nodes may be defined in an overlay algorithm and follow a suitable protocol, such as the RELOAD protocol.

Further details of the RELOAD protocol and examples of an embodiment of a P2P overlay, its components and the conventional attach procedures may be found in the internet draft "A Constrained Application Protocol (CoAP) Usage for REsource Location And Discovery (RELOAD)" of Aug. 20, 2012 by J. Jimenez, J. Lopez-Vega, J. Maenpaa and G. Camarillo, available online at: http://tools.ietf.org/html/draft-jimenez-p2psip-coap-reload-02, and in the internet draft "Resource Location And Discovery Base Protocol" of Nov. 5, 2012 by C. Jennings, B. B. Lowekamp, E. K. Rescorla, S. A. Baset, and H. G. Schulzrinne, available online at http://tools.ietf.org/html/draft-ietf-p2psip-base-23.

It will be appreciated, however, that the network may implement a different network topology and/or implement different signalling protocols and/or overlay algorithms.

Figure 2:
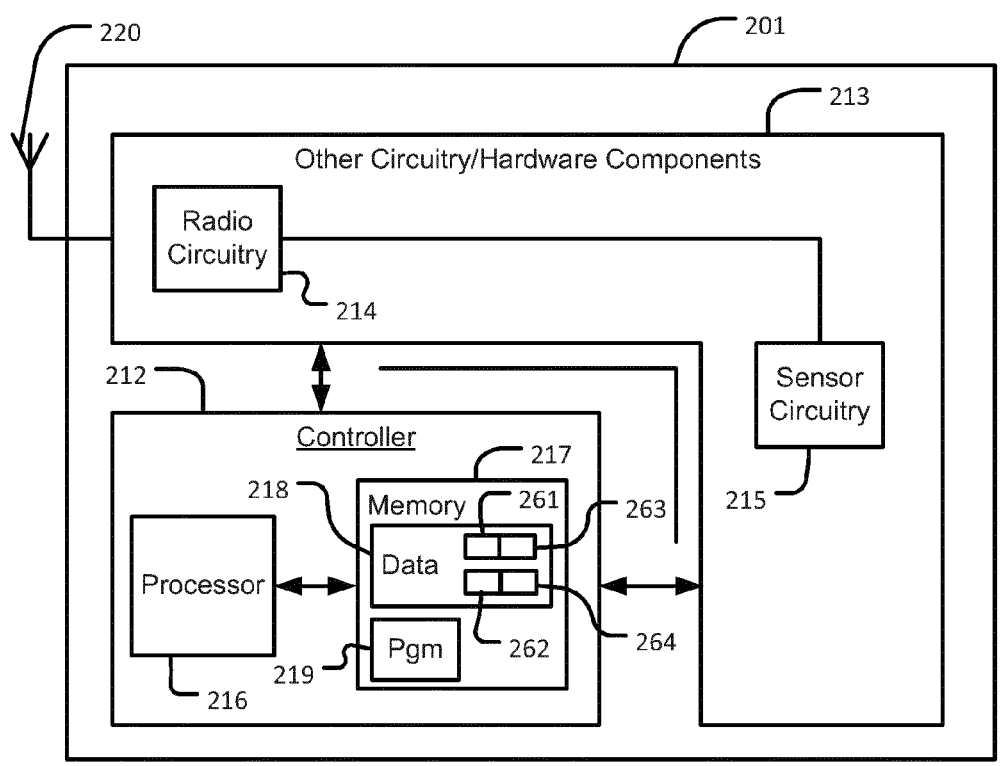
FIG. 2 shows a schematic block diagram of a processing device operable as a node of a P2P overlay network as described herein.

FIG. 2 shows a schematic block diagram of a processing device 201 operable as a node of a P2P overlay network as described herein, e.g. the overlay network of FIG. 1. The processing device 201 comprises a controller 212 and other circuitry and/or hardware components 213 suitably connected to the controller 212. The controller 212 comprises a processing circuit 216 and a memory 217 connected to the processing circuit. The processing circuit 216 may be a microprocessor, CPU, or other suitable processor. The memory 217 may be any suitable volatile or non-volatile memory or other data storage device. The memory 217 may have stored thereon data 218 and computer program code 219, the program code 219 being adapted to cause the processing circuit 216 to perform processes to be performed by the processing device, such as the steps of embodiments of the method described herein that are performed by the processing device 201, e.g. steps described with reference to FIGS. 3, 6, 8-11 below. In particular, the memory may have stored thereon a private node-ID 261 and a public node-ID 262 and corresponding cryptographic keys 263 and 264, respectively, associated with respective ones of the node-IDs. The other hardware components/circuitry 213 may optionally comprise a sensor device 215 for detecting a physical quantity, a user interface, e.g. a display, keyboard, keypad, touch screen, and/or the like. The processing device 201 further comprises network interface circuitry, such as radio circuitry 214 for radio communication via an antenna 220 with a radio access network. The example of FIG. 2 shows a processor-implemented embodiment, but alternative embodiments could use hardwired elements or a combination of both. The processing device may be connectable to the overlay as a peer or as a client. It will be appreciated, however, that, depending on the computational resources, usage patterns, storage capacity, and/or power supply, some processing devices may be more suitable for connection as clients rather than as peers, while other processing devices may be connectable equally well as peers and as clients or more suitably connectable as peers.

In the following, embodiments will be described in the context of RELOAD and, in particular, modifications to prior art RELOAD systems will be described that facilitate support of resource-constrained peers (e.g. actuators) and battery-powered clients (e.g. sensors) in RELOAD overlays. Moreover, an embodiment of a mechanism will be described in the context of RELOAD that allows battery-powered nodes that cannot connect as clients to build a cluster in order to share the burden of participating on the overlay operations as a peer.

Figure 3:
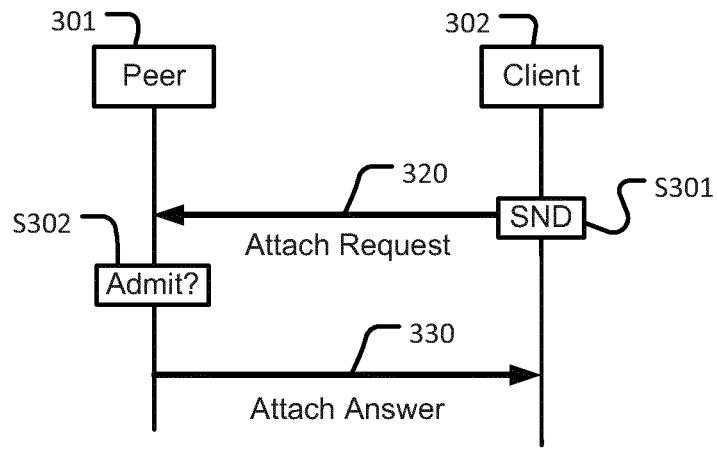
FIG. 3 shows an example of a process for connecting a client node to an overlay network.

FIG. 3 shows an example of a process for connecting a client node to an overlay network, e.g. the overlay network of FIG. 1 such as a RELOAD overlay network.

In step S301, the processing device 302 requesting to connect to the network sends an attach request 320 to a peer node 301 of the network.

Figure 4:
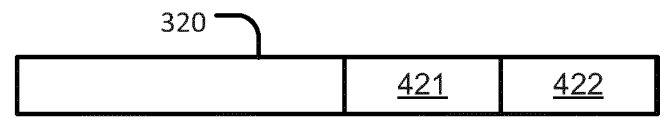
FIG. 4 shows an example of the message structure of an attach request for attaching a node to another node of a P2P overlay network.

FIG. 4 shows an example of the message structure of the attach request 320, e.g. a modified RELOAD Attach Request message. In particular, the attach request 320 comprises a field 421 indicating whether the requesting device 302 requests attachment as a client node. It will be appreciated that the attach request 320 may comprise a number of additional fields. A specific example of an attach request may have the following structure:

```
struct {
    opaque       ufrag<0..2^8-1>;
    opaque       password<0..2^8-1>;
    opaque       role<0..2^8-1>;
    IceCandidate candidates<0..2^16-1>;
    Boolean      send_update;
    Boolean      client_node;
}
AttachReq;
```

Where the field 421 is implemented as a Boolean field "client_node". This field is set to TRUE when the node 302 wants to attach as a client, and to FALSE otherwise (e.g. when the node 302 is a joining peer or a finger).

The attach request may further comprise a field 422 indicating whether the requesting node 302 wishes to receive periodic or otherwise recurring updated messages. Again, this field may be implemented as a Boolean field and named "send_update". An example of the use of such a field will be described in greater detail below.

Again referring to FIG. 3, in step S302, upon receipt of the attach request 320, the admitting node 301 determines whether it still has sufficient resources to admit an additional client attached to it. For example, the admitting node may determine whether a predetermined maximum number of attached clients has already been reached, or the admitting node may make the determination based on other criteria, e.g. current memory usage, etc.

The receiving node can thus choose to accept the new connection, or reject it if the attaching node is a client or a finger, but the peer does not have enough resources to accept it (e.g. too many connections), or the overlay configuration does not allow clients (i.e. <clients-permitted> false </clients-permitted>). A finger is a peer node that is already part of the overlay.

Based on the determination of step S302, the admitting node 301 returns an answer message 330 to the requesting device 302. If the admitting node 301 has determined that the additional client 302 may be admitted, the attach answer is an acceptance message and followed by further connection steps, e.g. as described in the RELOAD specification (ibid.). If the admitting node 301 has determined that the additional client 302 cannot be admitted, the attach answer is a rejection message. It may cause the client to connect as a peer or to start a new cluster of clients or to join an existing cluster, as described herein.

To this end, the rejecting answer message may comprise an error code indicating to the requesting node 302 that the request is rejected. Such an error code "Error_Connection_Rejected" may be defined as: Error_Connection_Rejected: An attach procedure cannot be performed because the peer does not have enough resources, or the overlay configuration does not allow clients.

This error code is included in an Attach Answer message when the peer does not have enough resources to accept a new connection from a client or a finger connection. In some embodiments, this error is not employed to reject the connection from a joining peer in Chord. Although both fingers and joining peers may send an Attach Request with a client_node=FALSE, they can be distinguished by its node-ID. In Chord, joining peers have a node-ID between the admitting peer and its successor. Otherwise the attaching peer only wants to set up a finger and may be rejected. Notice that in Chord a joining peer replaces the connection to one of the successor peers of the admitting peer, and thus may be accepted without increasing the total number of connections.

In any event, the attach answer message does not need to include the client_node field, but it may include the field, e.g. set to a default value such as FALSE, in order to use the same message structure for both messages.

Rejected fingers may look for a different node in the same section of a Chord ring, whereas a rejected client may try to join as a peer and create a new cluster, as is described in greater detail below. In particular, in the context of Chord, a node may have a finger connection with several alternative nodes. Depending on which node it connects to, routing will work slightly differently since different nodes manage different parts of the overlay. Therefore, depending on which node it connects to, a particular message may be routed through a different set of nodes.

Figure 5:
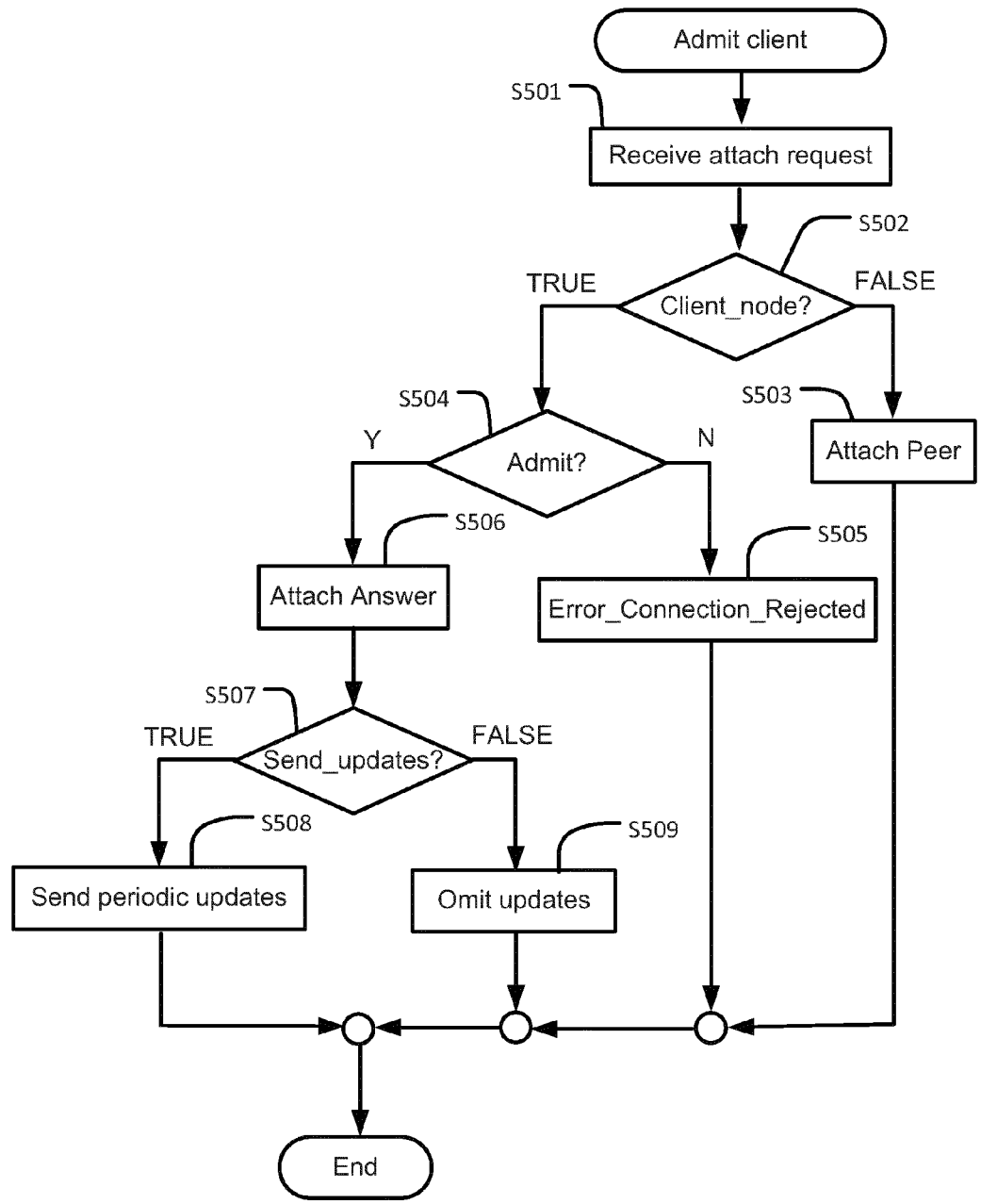
FIG. 5 shows a flow diagram of an example of a process for admitting a new client node by an admitting peer.

FIG. 5 shows a flow diagram of an example of a process for admitting a new client node by an admitting peer, e.g. admitting peer 301 of FIG. 3.

In initial step S501, the admitting node receives an attach request from a requesting new node, the attach request comprising a client_node field and a send_update field, as described above. In step S502, the admitting node determines whether client_node field is set to TRUE or FALSE. If the client_node field is FALSE, the process continues at step S503 by performing an attach process for a new peer, e.g. as described in the RELOAD specification (ibid.). If the client_node field is set to TRUE, the admitting peer proceeds at step S504 and determines whether the admitting node can admit a further client, e.g. as described in connection with FIG. 3 above. If the admitting peer determines that it cannot admit further clients, the process proceeds at step S505 where the admitting peer sends an attach answer message to the requesting node including the above error code "Error_Connection_Rejected". Otherwise, if the admitting peer determines that it can admit an additional client, the process proceeds at step S506 where the admitting peer sends an attach answer message initiating the attach process, e.g. as described in the RELOAD specification (ibid.). In step S507, the process determines whether the send_updates field in the attach request was set to TRUE or FALSE. If the send_update field is set to TRUE, the process proceeds at step S508 where the admitting peer sends periodic update messages to the newly admitted client. Otherwise, if the send_update field is set to FALSE, the process proceeds at step S509 where the admitting peer does not send any periodic update messages to the newly admitted client.

Hence, a mechanism is introduced allowing a client to use the send_update flag to signal to the admitting peer whether it wishes to receive periodic updates. In order to prevent the admitting peer from sending periodic updates to intermittent-connected clients, a client (client_node=TRUE) may set this flag to FALSE. In that case the peer marks that connection as update-free and refrains from sending any update message through it. On the other hand, clients that still want to receive updates, including an immediate one, may set this flag to TRUE (send_update=TRUE). For non-client nodes (client_node=FALSE) the send_update flag may indicate to the admitting peer that the newly attached peer requests an immediate update message once the attach procedure is over.

Clients that do not receive updates may still periodically check whether the current peer they are connected to is still the best one (e.g. the one responsible for its node-ID). This can be done by different means, for example by sending Route Requests to its current peer with send_update=TRUE, or sending a Ping message to its own node-ID in order to know which peer is the responsible one.

Figure 6:
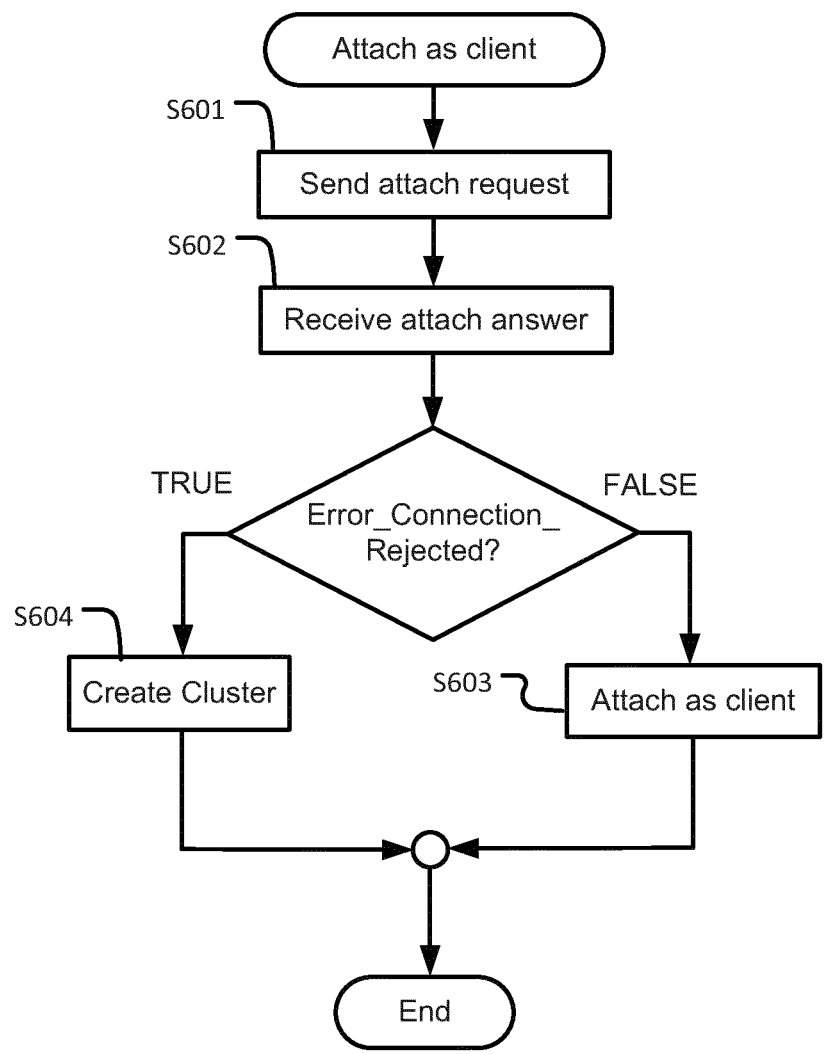
FIG. 6 shows a flow diagram of a process, performed by a processing device, for connecting to an overlay network.

FIG. 6 shows a flow diagram of a process, performed by a processing device, for connecting to an overlay network as a client node, e.g. the overlay network of FIG. 1. For example, the processing device may be a battery-powered device such as a sensor, or another resource-constrained device that wishes to connect to the overlay network in a resource-conserving manner.

To this end, in initial step S601, the processing device sends an attach request to its admitting peer, e.g. via a bootstrap node (e.g. the initial peer in the overlay network). The attach request may include a client_node field set to TRUE so as to allow the admitting peer to determine which type of node is attaching by checking its node-ID and the client_node field. Thus, the admitting peer may either accept or reject the attach request and send a corresponding answer message. Accordingly, in step S602, the processing device receives the answer message. If the answer message indicates an acceptance of the attach request, the process proceeds at step S603 performing an attachment as a client, e.g. as described in the RELOAD specification (ibid.). If the answer message indicates a rejection of the request, e.g. by means of an Error_Connection_Rejected error code as explained above, the process proceeds at step S604, where the processing device attaches as a peer and establishes a new cluster of nodes, as described in greater detail in the following.

Generally, it will be appreciated that, as the number of clients in the overlay increases, resource-constrained peers (e.g. actuators) will start rejecting them as clients. Therefore the only way for rejected clients to connect to the overlay is to join it as full peers. However, since being a peer implies being awake all the time in order to forward messages and store resources, disclosed herein is a mechanism allowing battery-powered or otherwise resource-constrained processing devices to group together to build a cluster of devices, where at a given point in time only one of them acts as a peer. This member of the cluster will also be referred to as the cluster head. The other members of the cluster, in the following also called cluster nodes, are attached to the cluster head as clients, and thus can be sleeping most of time, i.e. only one of them needs to be awake at each point in time other than during a cluster head handover or when a new node joins the cluster.

Figure 7:
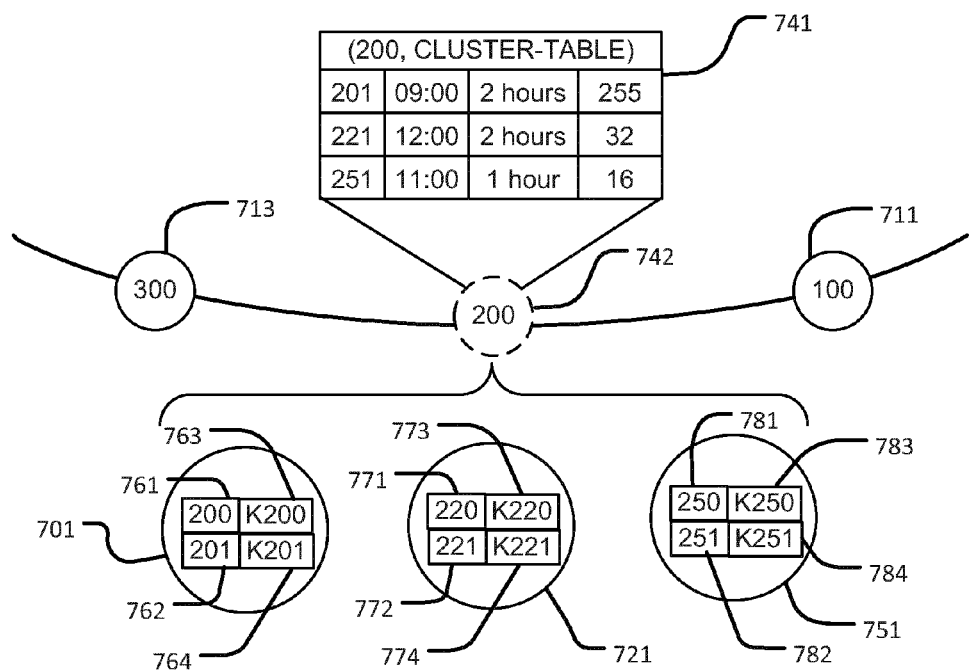
FIG. 7 schematically illustrates an example of a part of an overlay network including a cluster as described herein.

FIG. 7 schematically illustrates an example of a part of an overlay network including a cluster as described herein. The overlay network comprises peer nodes 711 and 713, and a cluster comprising nodes 701, 721, and 751. In the example of FIG. 7, node 701 acts as cluster head while nodes 721 and 751 are cluster nodes.

In order to share the burden of being awake and acting as a peer, the cluster head role is rotated periodically among all nodes forming the cluster. Therefore, when the node being the cluster head ends its shift, a cluster node should awake and become the new cluster head. The period of time a node acts as the cluster head will be referred to as the cluster head period; its length may be application-specific. For instance, in an application that employs smartphones or otherwise rechargeable sensors (e.g. by means of a solar panel), it may be desirable to select the cluster head period to be smaller than the estimated battery duration while being a cluster head. The cluster head period can be statically configured in the nodes or computed dynamically (e.g. choosing the minimum one of all cluster nodes).

The process of transferring the cluster head role from one member of the cluster to another member of the cluster is called cluster head handover; it involves the new cluster head joining the overlay as a peer and the old cluster head leaving it. Although it is possible to use standard RELOAD join and leave procedures to implement the cluster head handover, this would greatly increase the churn and signalling traffic of the overlay, because it would require neighbouring peers to update their routing tables and to copy resources in order to cope with the changes in the overlay topology.

Instead, in some embodiments, the cluster implements an enhanced cluster head handover process, where the cluster head maintains the same node-ID independently of which cluster node is actually being the cluster head peer. Therefore, the proposed cluster head handover process reduces to the new cluster head taking over the connections to neighbouring nodes and fingers of the old cluster head. Thus, the proposed cluster head handover does not generate any unnecessary churn in the overlay, because it is seen by peers outside the cluster just as a peer changing its IP address, and thus they do not need to update their routing tables or copy any resource.

In order to facilitate an efficient cluster head handover process, the client nodes 701, 721, 751 each have stored therein two consecutive node-IDs, 761, 762; 771, 772; 781; 782, respectively. It will be appreciated that, in general, the node-IDs do not need to be consecutive, but consecutive node-IDs allow for particularly simple implementations. Each client may further have stored therein two cryptographic keys 763, 764; 773; 774; 783; 784, respectively associated with respective digital certificates associated with the respective node-IDs; alternatively the security of the overlay may be based on a shared-key, and thus no further keys are necessary. Depending on the overlay security model these two certificates can be self-signed, or assigned by the enrolment server. In any case these two identities have very different purposes. One of the two node-IDs, e.g. the higher node-ID is employed to identify the node itself, and thus its associated key is kept strictly private. This node-ID is also referred to herein as the private node-ID. The other of the two node-IDs will be referred to as the public node-ID; it is employed during the creation of a new cluster. The public node-ID of the node creating a new cluster will be used as the node-ID of the cluster head identifying the cluster within the overlay network. Hence, this node-ID will also be referred to as cluster node-ID. Therefore, this identity, including its associated key, is shared among all nodes of the cluster. The key associated with the public node-ID of the node creating a new cluster will also be referred to as the cluster key. This cluster key is stored in a special single value resource 742 with a newly defined CLUSTER-KEY Data Kind-ID, which is not shared with any node outside the cluster. A second Dictionary resource 741 with the CLUSTER-TABLE Data Kind-ID is employed to store the cluster information in the following manner: the node-IDs of the cluster nodes are employed as index of the respective entries, and each entry has three associated values:

The first value represents the next instant when such node will become the cluster head, encoded as a UNIX time; this entry may be 64-bits long.

The second value is 32-bits long and specifies the cluster head period of the node, measured in seconds. The value 0xFFFF means that the node could be the cluster head permanently.

The third value is 8-bits long and specifies the maximum number of clients and fingers connections the device is able to support. The value 0xFF means that the node supports an unlimited number of connections.

It will be appreciated that the above cluster information may be stored in a different manner and made accessible to the members of the cluster, e.g. using a different data structure. The cluster information 741 may e.g. be stored in the node 701 that has created the cluster and/or by one or more other nodes of the cluster.

In the following, and with continued reference to FIG. 7, examples of the different procedures performed by clustering-enabled nodes will be described in order to: create a new cluster, join a cluster, and perform the cluster head handover.

Figure 8:
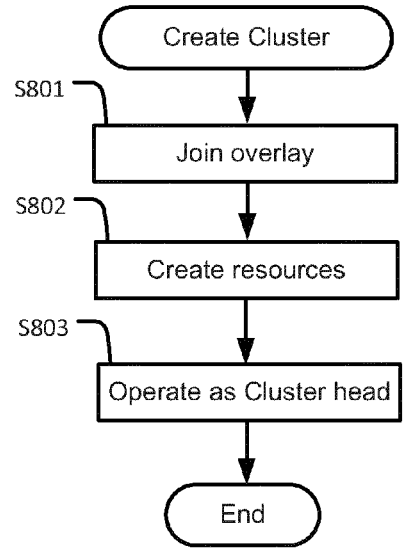
FIG. 8 shows a flow diagram of an example of a process for creating a new cluster.

FIG. 8 shows a flow diagram of an example of a process for creating a new cluster. For the purpose of the description of this example, it is assumed that a battery-powered sensor node 701 with a public node-ID 761 (e.g. having a value 200) and a private node-ID 762 (e.g. having a value 201) has tried to connect to a Chord-based RELOAD overlay network as a client using its private node-ID, e.g. as described with reference to FIG. 6 above, but was rejected by its resource-constrained admitting peer (e.g. node 711 of FIG. 7), which already has too many clients and/or fingers. It will be appreciated, however, that the process described in the following may also be performed by other types processing devices, other than sensors and resource-constrained peers. It will further be appreciated that the specific values of the node-IDs merely serve as illustrative examples.

As the sensor node 701 cannot connect as a client it may connect as a peer but, as it supports clustering, it creates a new cluster, by performing the following steps which are an example of the steps performed by step S604 of FIG. 6 above:

In step S801, the sensor node 701 joins the overlay network, e.g. by a process described in connection with FIG. 5 above, but in order to create a new cluster, the sensor node 701 employs its public node-ID 761 and corresponding certificate 763 to authenticate with all its neighbours (successors, predecessors and fingers). The public node-ID 761 of the node that created the cluster is therefore the cluster node-ID.

In step S802, the node 701 then creates two new resources: a CLUSTER-KEY Single Value resource 742 storing the private key associated with the cluster node-ID certificate 763, and a CLUSTER-TABLE Dictionary resource 741. Initially the CLUSTER-TABLE contains a single entry, indexed with the private node-ID 762 (having value 201 in the present example), that contains the current time, e.g. encoded in UNIX time (e.g. 09:00:00 UTC Sep. 1, 2012=1346482800), the pre-configured cluster head period of the node (e.g. 2 hours=7200 seconds), and the maximum number of supported clients (e.g. unlimited=255). Both resources are stored using the cluster node-ID as its Resource ID. They may be stored at any suitable location, e.g. by a node of the overlay, according to the applicable rules of the overlay.

The following is an example of the values of the values of these resources after creation of the new cluster:

(200, CLUSTER-KEY): 112233 . . .
(200, CLUSTER-TABLE):

| Node-ID | Next CH Time | CH Period | Max conn. |
|---------|--------------|-----------|-----------|
| 201 | 09:00 | 2 hours | 255 |

The CLUSTER-TABLE resource may be replicated as any other resource according to the resource replication mechanisms of the overlay network, e.g. in at least three successor nodes as specified by Chord. However, the CLUSTER-KEY should not be made accessible to nodes outside the cluster is thus normally not replicated, and any Fetch requests from nodes outside the cluster should return an Error_Forbidden response. It may be stored by one or more nodes of the cluster.

In step S803, the processing device 701 operates as cluster head as the newly created cluster. Since the new cluster only has one node, this node is the cluster head; the node 701 is therefore awake and acts as a full RELOAD peer until another node joins the cluster. While being the cluster head, a node does not employ its private node-ID 762 (here having a value 201) to communicate with other peers of the overlay, but the cluster node-ID (having a value 200 in this example) instead.

Figure 9:
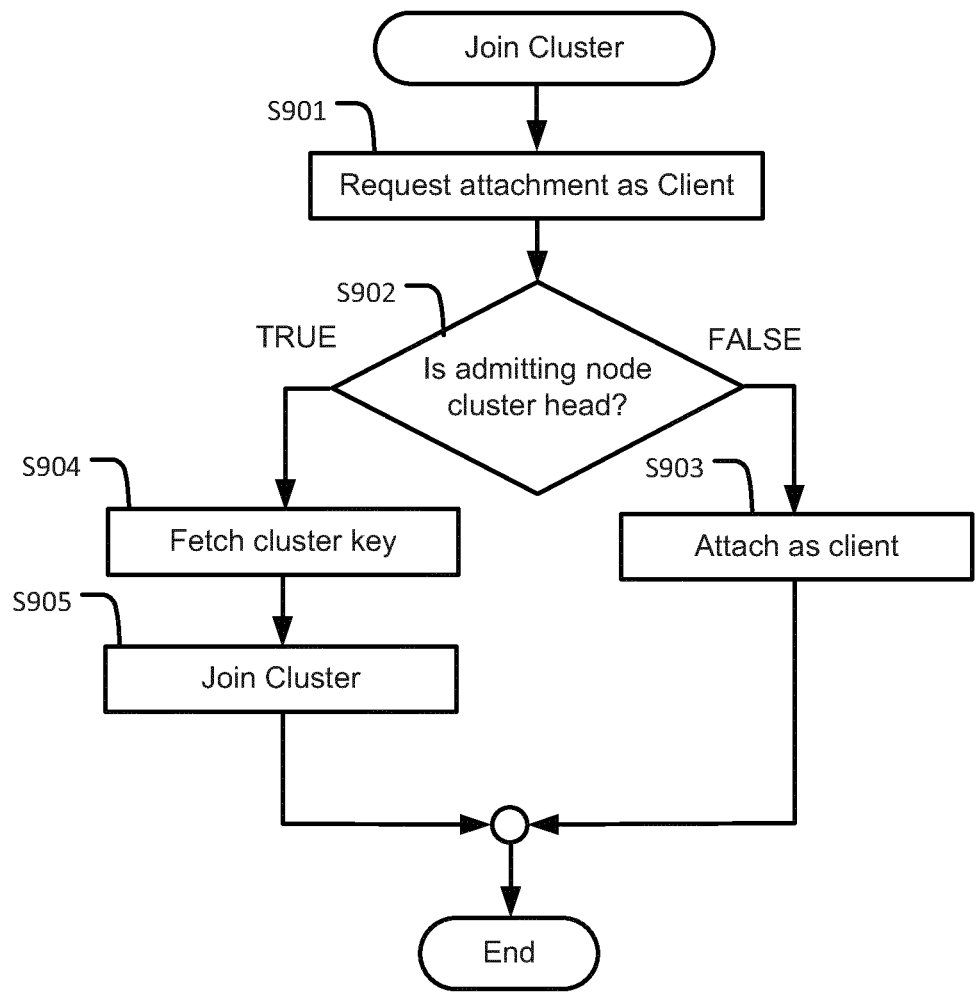
FIG. 9 shows a flow diagram of an example of a process for joining a new cluster, allowing a processing device to join an existing cluster as a new node.

FIG. 9 shows a flow diagram of an example of a process for joining a new cluster, allowing a processing device to join an existing cluster as a new node.

In initial step S901, a processing device 751 requests connection to the overlay network as a client with the cluster head 701 as an admitting peer. For the purpose of the description of this example, it is assumed that processing device is a sensor node with public node-ID 781 (e.g. having a value 250) and private node-ID 782 (e.g. having a value 251), and that node 751 tries to connect at a certain point in time (e.g. at 10:00) after creation of the cluster by node 701.

In step S902, after the second node 751 has attached to the first node 701 as a client (client_node=TRUE, send_update=FALSE), e.g. as described above, the newly attached node 751 checks whether the admitting peer is a cluster head or a regular peer (e.g. actuator). To do so, it may try to fetch from the admitting peer the CLUSTER-TABLE Kind-IDs associated to its node-ID 701. If the admitting peer does not support clustering, it would not return any value and the attaching node can proceed to step S903 and behave as simple RELOAD client.

If, as in the present example, the admitting peer 701 is a cluster head, the admitting peer returns the requested cluster information. Once the new node notices that it can join a cluster, it proceeds at step S904 and fetches the CLUSTER-KEY and stores it locally (it already has the associated certificate because it is the one being employed by the cluster head that admitted the node in the first place).

In step S905, the node 751 joins the cluster by adding its private node-ID 782 to the CLUSTER-TABLE 741 using a "Store" operation. Notice that public node-IDs are only employed to create a new cluster, and thus the public node-ID 781 of the node joining an existing cluster is not used. Instead cluster nodes joining an existing cluster only employ their own private node-ID 782, unless they become the cluster head when they use the cluster node-ID 761. Node 751 further calculates the time when it has to become the cluster head. To this end, node 751 may look for the newest time in the cluster table (in the above example 9:00), and then add the associated cluster head period (e.g. 9:00+2 hours=11:00 when the cluster head period is 2 h).

The resulting cluster table 741 may thus comprise the following information after node 751 has joined the cluster:

(200, CLUSTER-TABLE):

| Node-ID | Next CH Time | CH Period | Max conn. |
|---------|--------------|-----------|-----------|
| 201 | 09:00 | 2 hours | 255 |
| 251 | 11:00 | 1 hour | 16 |

If the computed cluster head time is already in the past, node 701 stores the current time in the cluster table and initiates a cluster head handover process immediately, e.g. as described with reference to FIG. 11 below. Otherwise it can behave as a normal client, awakening and sleeping as it desires until the time of the computed cluster head time arrives.

Figure 10:
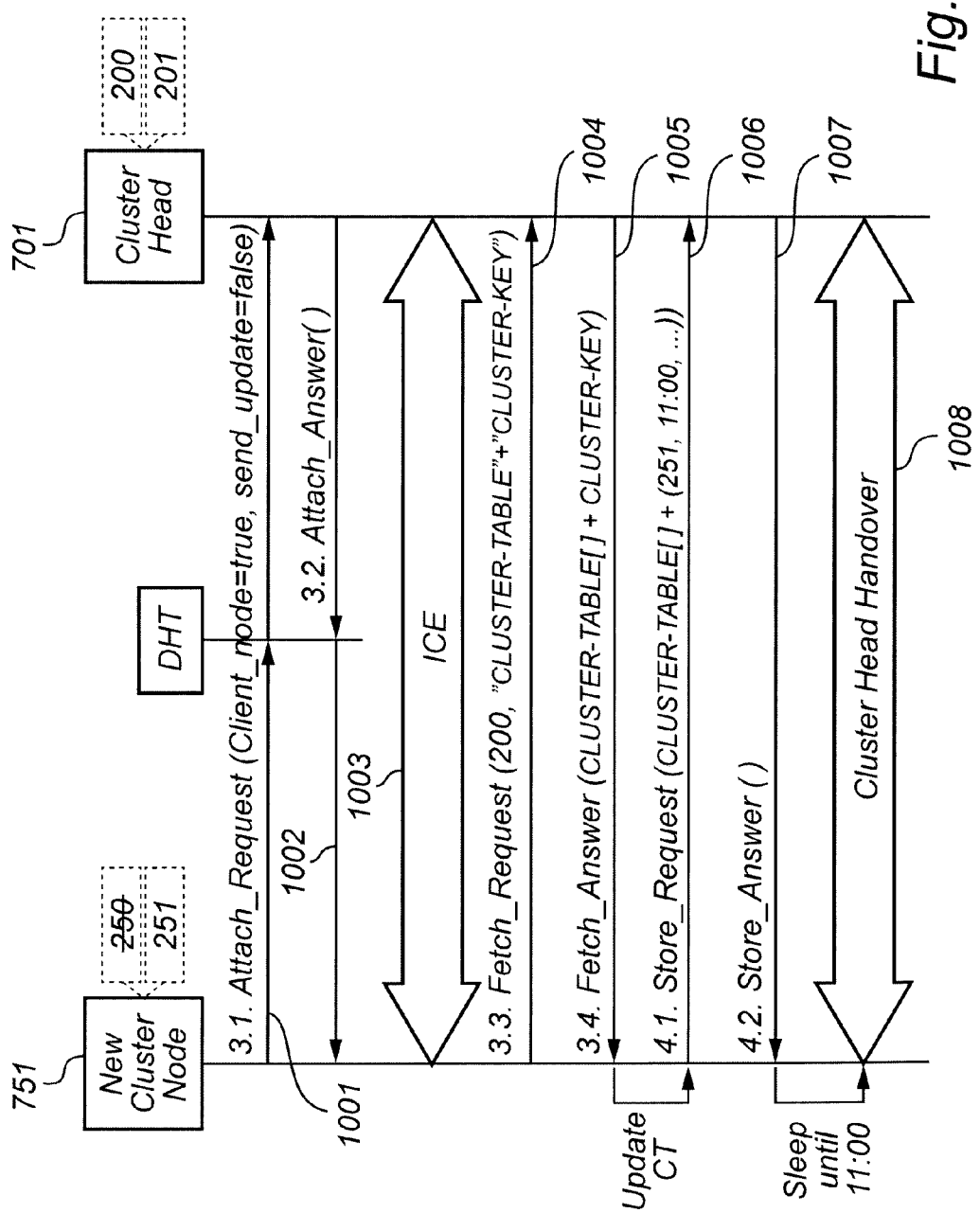
FIG. 10 shows a message flow diagram illustrating the messages exchanged between the cluster head and the new cluster node joining the cluster.

FIG. 10 shows a message flow diagram illustrating the messages exchanged between the cluster head 701 and the new cluster node 751 joining the cluster in the above example. Initially, the new node sends an attach request 1001 to the cluster head which responds with an attach answer 1002. This process is followed by an Interactive Connectivity Establishment (ICE) process (1003). Subsequently, the new node 751 fetches the cluster information by a fetch request 1004 followed by a fetch answer 1005 from the cluster head. The new node then updates the cluster table and causes the cluster head to store the updated information by means of a store request 1006. After receipt of the corresponding acknowledgement (1007), the client may enter a sleep mode until it is time to initiate a cluster head handover 1008.

A corresponding cluster joining process is repeated by all new clustering-enabled nodes, unless the smallest connection limit of all cluster nodes (e.g. 16 in the above example) is reached. For instance a bit later (e.g. at 10:30) a third node 721 (e.g. having a private node-ID of value 221) joins the cluster thus resulting in the structure shown in FIG. 7. Again, the new node 721 fetches the CLUSTER-KEY and CLUSTER-TABLE to compute its cluster head time (e.g. 11:00+1 hour=12:00), resulting in the updated cluster table:

| (200, CLUSTER-TABLE): | | | |
|---|---|---|---|
| Node-ID | Next CH Time | CH Period | Max conn. |
| 201 | 09:00 | 2 hours | 255 |
| 221 | 12:00 | 2 hours | 32 |
| 251 | 11:00 | 1 hour | 16 |

It is worthwhile noting that at any given time it is possible to know which node is the current cluster head, other than looking for the cluster node-ID, because the cluster head node should have the oldest time in the CLUSTER-TABLE and be the only one in the past.

Figure 11:
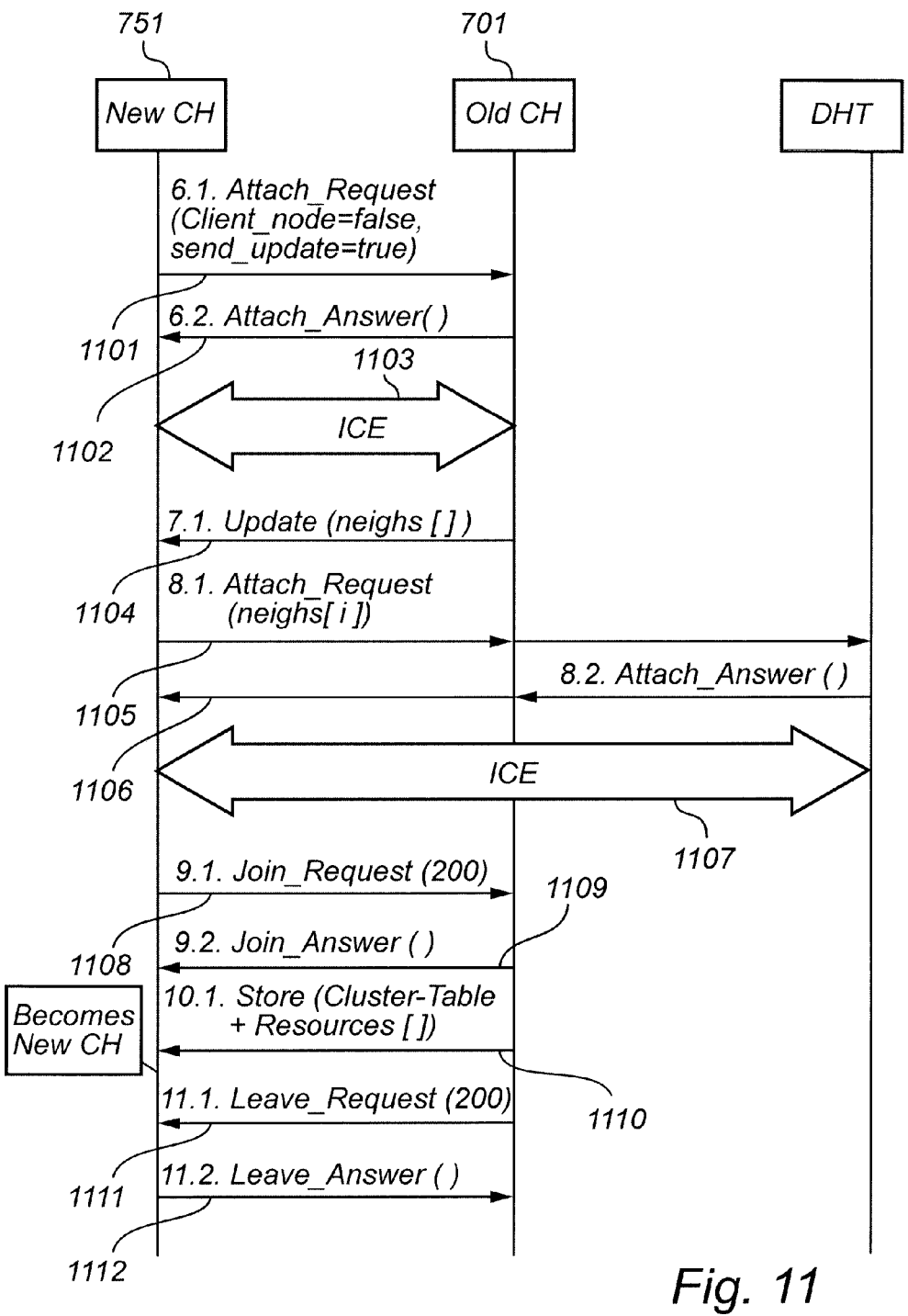
FIG. 11 shows the message flow between the current cluster head and the next cluster head during an example of a cluster head handover.

FIG. 11 shows the message flow between the current ("old") cluster head 701 and the next ("new") cluster head 751. When the cluster head period of the current cluster head 701 is over, another cluster node awakes and takes over the cluster head role. To do so, the new cluster head initiates a cluster head handover process, joining the overlay network as a peer, and replacing the old cluster head. This involves getting the routing table and all the resources from the old cluster head, as well as connecting to all the neighbours of the old cluster head in the overlay network (predecessors, successors and fingers in Chord). However, when the new cluster head employs the same node-ID as the old cluster head, this peer replacement is almost transparent, in the sense that it does not generate any changes in the overlay topology. The cluster head handover does not require any new message but it may reuse standard RELOAD messages. In particular, an embodiment of the cluster head handover is similar to the RELOAD Join operation, although in order to easily differentiate it from a new peer trying to join the overlay, the new cluster head uses the cluster node-ID instead of its private node-ID.

In the following, an example of the cluster head handover process will be illustrated with reference to the previous example described with reference to FIG. 7 through 11, i.e. assuming that the cluster head period of the initial cluster head node 701 has arrived (i.e. at 11:00 in the present example), and the second node 751 awakes to start the cluster head handover process:

To this end, node 751, which is to become the next cluster head, first attaches to the current cluster head, reusing a previous client connection or creating a new one via a suitable bootstrap node (e.g. a neighbour node with an accessible public IP address). The new cluster 751 head node thus sends an attach request 1101 to the old cluster head 701. The attach request message 1101 includes the flags client_node=FALSE and send_update=TRUE, and it uses the cluster node-ID (in this example having the value 200) as its sender identity, instead of the private node-ID 751 of the new cluster head which was previously used to connect to the cluster head as a client. The old cluster head responds with a corresponding request answer message 1102 followed by an ICE process 1103.

The send_update=TRUE attach flag triggers the old cluster head to send its whole routing table in an update message 1104 immediately after the attach process is over.

Until the cluster head handover process is finished, the new cluster head can employ the thus established connection with the old cluster head to send RELOAD messages to the overlay.

Then, the new cluster head node 701 starts attaching to each of the neighbour and finger peers in the routing table of the current cluster head, in order to replace it. To this end, the new cluster head node 701 exchanges an attach request message 1105 and a request answer 1106, followed by an ICE 1107 with each of the neighbours. Notice that the new cluster head is also employing the same cluster node-ID (including the corresponding cluster key) to connect to the peers. Therefore the peers do not consider these connections to come from a new node, but from the old cluster head.

In some embodiments, two nodes may have multiple connections simultaneously, thus supporting peer mobility (i.e. a peer changing it IP address) while, in other embodiments, they may only have one. In any case, the attach process from the new cluster head either replaces the previous connection, or the two connections will be maintained until the old cluster head closes its own.

Once the new cluster head has connected to all peers in the routing table, it sends a Join message 1108 to the old cluster head (again using the cluster node-ID as its own node-ID) to initiate the copy of resources into the joining node. Notice that in Chord, since the new node is using the cluster node-ID, which by definition is the lowest node-ID of the cluster, all resources of the old cluster head should be copied into the new cluster head.

When receiving the Join operation, the old cluster head responds with a join answer message 1109 and closes all the connections with its previous neighbours. The old cluster head further starts copying all its resources into the new cluster head by means of one or more Store operations 1110, including the CLUSTER-TABLE. However, before sending the table, the old cluster head updates its own entry in the table, computing its next cluster head time as previously described. In the present example, the thus updated cluster table may thus comprise the following information:

| (200, CLUSTER-TABLE): | | | |
|---|---|---|---|
| Node-ID | Next CH Time | CH Period | Max conn. |
| 201 | 14:00 | 2 hours | 255 |
| 221 | 12:00 | 2 hours | 32 |
| 251 | 11:00 | 1 hour | 16 |

At this point the new cluster head has fully replaced the old cluster head and the cluster head handover process is completed. Thus the old cluster head may send a Leave Request 1111 to the new cluster head and, upon receipt of a corresponding Leave answer 1112, go to sleep until the computed cluster head time arrives. Meanwhile it can behave as a RELOAD client like any other cluster node.

In the above, embodiments of a method, a system and apparatus for an efficient connection of a wireless communications device to a wireless communications network have been described.

Embodiments of the method, a system and apparatus described herein enable battery-powered (e.g. sensors) or otherwise resource-constrained nodes (e.g. actuators) to connect to a P2P overlay network in a resource- and energy-efficient way, without the need of proxies or gateways, by enabling sleeping clients and by grouping battery-powered devices together in clusters to share the burden of being a peer of the overlay.

Some embodiments of the method, system and apparatus described herein further improve the current client specification for RELOAD: They permit explicit limitation of the number of clients and fingers per peer in the overlay. They allow a client node not to receive continuous unnecessary updates from the overlay. They enable a peer to know whether the incoming attach request comes from a client or a peer. Embodiments of the mechanism described herein introduce only minimal changes to RELOAD in order to enable all the proposed clustering and constrained-client functionality.

Although some embodiments have been described and shown in detail, the aspects disclosed herein are not restricted to them, but may also be embodied in other ways within the scope of the subject matter defined in the following claims. In particular, it is to be understood that other embodiments may be utilized and structural and functional modifications may be made. In particular, embodiments of the aspects disclosed herein have mainly been described with reference to networks using the Chord and RELOAD protocols. It will be understood, however, that embodiments of the methods, devices and systems may also be applied to other types of P2P overlay networks, such as overlay networks using a distributed hash table. The mechanism is almost transparent to other peers in the overlay, and no modification to their normal procedures of legacy peers is necessary.

In the following some of the embodiments of the invention shall be described.

There is provided a method for a processing device in a system of a plurality of processing devices 201 communicatively connected via a peer-to-peer overlay network 101, 102, 104; wherein any processing device 201 is configured to connect to the peer-to-peer overlay network as a peer node or 301 as a client node 302, that is, being a peer node or a client node; wherein a client node is connectable to the peer-to-peer overlay network via a peer node. The method comprises, the steps of the processing device 201 sending a connection request 320 to a peer node 301, the connection request 320 comprising an indication 421 that said processing device wants to attach as a client node 302.

The processing device 201 may moreover send to the peer node 301, a message, for instance comprised in the connection request 320, the message being indicative 422 of a request 320; 422 not to receive any recurring update messages.

There is further provided a method for a processing device in a system of a plurality of processing devices 201 communicatively connected via a peer-to-peer overlay network 101, 102, 104; wherein any processing device 201 is configured to connect to the peer-to-peer overlay network as a peer node or 301 as a client node 302, that is, being a peer node or a client node; wherein a client node is connectable to the peer-to-peer overlay network via a peer node.

The method comprises for the processing device being a peer node 301 when receiving a connection request 320 comprising an indication 421 that another processing device wants to attach as a client node 302.

determining, whether the processing device can admit S504 further connections of client nodes; and—responsive to the connection request, returning a rejection message 330, S505 to said another processing device, if the processing device receiving the connection request cannot admit further connections of client nodes.

The method may moreover comprise—receiving, from said another processing device 302 from which a connection request 320 was received S501, a message 320, for instance comprised in the connection request, the message being indicative 422 of a request not to receive any recurring update messages; and—responsive to the received message 320, omitting S509 sending recurring update messages to said another processing device from which the message has been received.

According to an embodiment,—if not receiving a message being indicative 422 of a request not to receive any recurring update messages, the processing device is—sending recurring update messages S508 to said another processing device.

Some or all of the processing device or devices may be battery powered.

The peer-to-peer communications network may use the Resource Location and Discovery Protocol, RELOAD. The connection request 320 may be an attach request and the response 330 to the attach request may be an attach answer.

The processing device 201, may be adapted to send a connection request 320 comprising an indication 421 that the processing device wanting to attach as a client node 302, does not have routing or storage responsibilities in respect of the peer-to-peer overlay network.

The rejection message may indicate that an attach procedure cannot be performed because the processing device being a peer node does not have enough resources, or the peer-to-peer overlay network does not allow further clients.

In one embodiment the processing device is configured to form one of the nodes 701 of a cluster and is operable to perform a cluster head role connecting the cluster to the peer-to-peer overlay network, the processing device thereby acting as a peer, while other cluster nodes, are attached to the cluster head as clients, and wherein the processing device, as cluster head role, is configured to transfer the cluster head role to another node 721, 751 of the cluster, such that the cluster head role is handed over from one node to another among the nodes in the cluster.

In a further embodiment, client nodes do not have routing or storage responsibilities. The cluster node having the cluster head role acting as a peer enables the other cluster nodes, which are attached to the cluster head as clients, to sleep, that is, to be in an energy-conserving state.

Each of the cluster nodes may be associated with a private node identity 261; 761; 771; 781 and a public node identity 262; 762; 772; 782; the public node identity being employed during the creation of a new cluster, in which the cluster only has one node, this node being the cluster head 803; said public node identity 761 of the cluster head subsequently identifying the cluster within the overlay network, that is, said public node identity becoming the cluster node identity.

When a node joins S801 the overlay network for creation of a new cluster, there is created a cluster table S802 containing an entry, indexed with the private node identity 762; 201 of the joining node, a next cluster head time; and a pre-configured cluster head period for said node.

When a subsequent node joins 751 the cluster S905, the cluster table is updated 1005, 1006 with a further entry, indexed with the private node identity 772, 221 of the subsequent node, a next cluster head time for the subsequent node and a pre-configured cluster head period for said subsequent node, wherein the subsequent node may act as a client and enter a sleep mode until it is time to initiate a cluster head handover 1008.

When the cluster head period of the current cluster head 701 is over, a cluster head handover process 1008 is initiated, in which a next cluster node according to a further entry in the cluster table is joining the overlay network as a peer cluster head, and is replacing the previous cluster head of the cluster table and is taking over the cluster head role.

This handover process involves the next cluster node getting a routing table from the old cluster head, as well as connecting to all the neighbour nodes of the previous cluster head in the overlay network, wherein the next cluster head employs the same node identity as the old cluster head.

As stated above, the peer-to-peer communications network may be using the Resource Location and Discovery Protocol, RELOAD, wherein 320 attach request and attach answer 330 messages are used.

In an embodiment, the next cluster 751 head node sends an attach request 1101 to the previous cluster head node 701 to initiate a cluster handover, wherein the attach request message 1101 comprises an indication 421 that the next cluster node is a client and an indication 422 of a request to receive any recurring update messages; the next cluster head using the cluster node identity 200 as its sender identity, instead of the private node identity 751 of the next cluster head.

There is further provided according to an embodiment of the invention, a processing device in a system of a plurality of processing devices 201 communicatively connected via a peer-to-peer overlay network 101, 102, 104; wherein any processing device 201 is configured to connect to the peer-to-peer overlay network as a peer node or 301 as a client node 302, that is, being a peer node or a client node; wherein a client node is connectable to the peer-to-peer overlay network via a peer node; the processing device comprising a processing circuit 216; network interface circuitry 214 connected to the processing circuit and a memory 217, said memory containing instructions executable by said processor, whereby the processing device is being operable to sending a connection request 320 to a peer node 301, the connection request 320 comprising an indication 421 that said processing device wants to attach as a client node 302.

The processing device 201 may moreover be operable to sending to the peer node 301, a message, for instance comprised in the connection request 320, the message being indicative 422 of a request 320; 422 not to receive any recurring update messages.

There is further described and shown a processing device in a system of a plurality of processing devices 201 communicatively connected via a peer-to-peer overlay network 101, 102, 104; wherein any processing device 201 is configured to connect to the peer-to-peer overlay network as a peer node or 301 as a client node 302, that is, being a peer node or a client node; wherein a client node is connectable to the peer-to-peer overlay network via a peer node; the processing device comprising a processing circuit 216; network interface circuitry 214 connected to the processing circuit and a memory 217, said memory containing instructions executable by said processor, whereby the processing device being operable to, when being a peer node 301,
  when receiving a connection request 320 comprising an indication 421 that another processing device wants to attach as a client node 302.
  determining, whether the processing device can admit S504 further connections of client nodes; and
  responsive to the connection request, returning a rejection message 330, S505 to said another processing device, if the processing device receiving the connection request cannot admit further connections of client nodes.

The processing device may be further operable to
receiving, from said another processing device 302 from which a connection request 320 was received S501, a message 320, for instance comprised in the connection request, the message being indicative 422 of a request not to receive any recurring update messages; and
responsive to the received message 320, omitting S509 sending recurring update messages to said another processing device from which the message has been received.

For example, the rejection message indicates that an attach procedure cannot be performed because the processing device being a peer node does not have enough resources, or the peer-to-peer overlay network does not allow further clients.

A processing device in a system of a plurality of processing devices 201 communicatively connected via a peer-to-peer overlay network 101, 102, 104; is moreover disclosed, wherein any processing device 201 is configured to connect to the peer-to-peer overlay network as a peer node or 301 as a client node 302, that is, being a peer node or a client node; wherein a client node is connectable to the peer-to-peer overlay network via a peer node. The processing device comprising a processing circuit 216; network interface circuitry 214 connected to the processing circuit and a memory 217, said memory containing instructions executable by said processor, the processing device being operable to
form one of the nodes 701 of a cluster and being operable to perform a cluster head role connecting the cluster to the peer-to-peer overlay network, the processing device thereby acting as a peer, while other cluster nodes, are attached to the cluster head as clients, and wherein the processing device, as cluster head role, is configured to transfer the cluster head role to another node 721, 751 of the cluster, such that the cluster head role is handed over from one node to another among the nodes in the cluster.

For example, the client nodes do not have routing or storage responsibilities, and wherein the cluster node having the cluster head role acting as a peer, enables the other cluster nodes, which are attached to the cluster head as clients, to sleep, that is, to be in an energy-conserving state.

Each of the cluster nodes may be associated with a private node identity 261; 761; 771; 781 and a public node identity 262; 762; 772; 782; the public node identity being employed during the creation of a new cluster, in which the cluster only has one node, this node being the cluster head 803; said public node identity 761 of the cluster head subsequently identifying the cluster within the overlay network, that is, said public node identity is becoming the cluster node identity.

Figure 12:
FIG. 12 shows a processing device comprising a sending module.

FIG. 12 shows a processing device comprising a sending module.

As shown in FIG. 12, a processing device is provided in a system of a plurality of processing devices 201 communicatively connected via a peer-to-peer overlay network 101, 102, 104; wherein any processing device 201 is configured to connect to the peer-to-peer overlay network as a peer node or 301 as a client node 302, that is, being a peer node or a client node; wherein a client node is connectable to the peer-to-peer overlay network via a peer node; whereby the processing device comprising:—a sending module SM for sending a connection request 320 to a peer node 301, the connection request 320 comprising an indication 421 that said processing device wants to attach as a client node 302.

Figure 13:
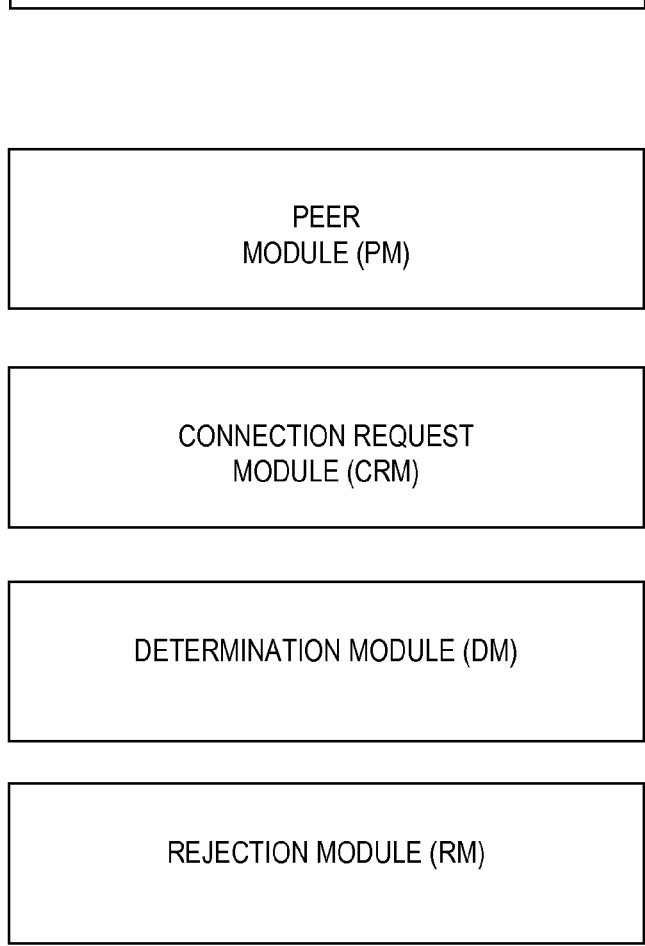
FIG. 13 shows a processing device comprising a peer module; a connection request module; a determination module and a rejection module.

FIG. 13 shows a processing device comprising a peer module; a connection request module; a determination module and a rejection module.

More specifically there is disclosed a processing device in a system of a plurality of processing devices 201 communicatively connected via a peer-to-peer overlay network 101, 102, 104; wherein any processing device 201 is configured to connect to the peer-to-peer overlay network as a peer node or 301 as a client node 302, that is, being a peer node or a client node; wherein a client node is connectable to the peer-to-peer overlay network via a peer node; comprising:—a peer module PM for operating as a peer node 301,—a connection request reception module CRM for receiving a connection request 320 comprising an indication 421 that another processing device wants to attach as a client node 302;—a determination module DM for determining, whether the processing device can admit S504 further connections of client nodes; and—a rejection module RM being responsive to the connection request, for returning a rejection message 330, S505 to said another processing device, if the processing device receiving the connection request cannot admit further connections of client nodes.

Figure 14:
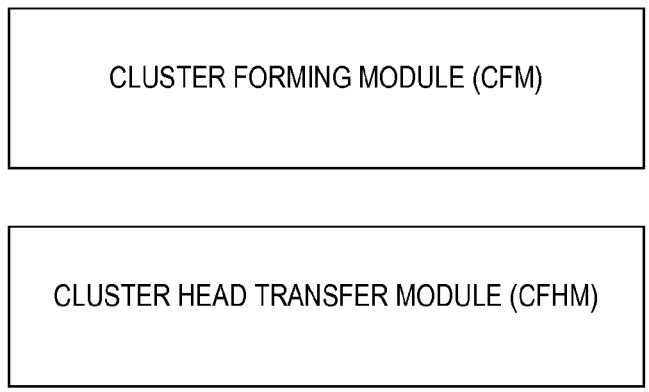
FIG. 14 shows a processing device comprising a cluster forming module and a cluster head transfer module.

FIG. 14 shows a processing device comprising a cluster forming module and a cluster head transfer module.

More specifically there is shown a processing device in a system of a plurality of processing devices 201 communicatively connected via a peer-to-peer overlay network 101, 102, 104; wherein any processing device 201 is configured to connect to the peer-to-peer overlay network as a peer node or 301 as a client node 302, that is, being a peer node or a client node; wherein a client node is connectable to the peer-to-peer overlay network via a peer node; the processing device comprising:

a cluster forming module CFM for forming one of the nodes 701 of a cluster and being operable to perform a cluster head role connecting the cluster to the peer-to-peer overlay network, enabling the processing device to act as a peer, while other cluster nodes, are attached to the cluster head as clients, and a cluster head transfer module CHTM for effectuating that the processing device, as cluster head role, is transferring the cluster head role to another node 721, 751 of the cluster, such that the cluster head role is handed over from one node to another among the nodes in the cluster.

The embodiments of the invention may be implemented as by means of a computer program product comprising computer program code 219 according to any of the steps of the methods explained above.

The methods explained above may furthermore be constituted a by Program for a computer or processor comprising computer program code 219.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of operating a system of a plurality of processing devices communicatively connected via a peer-to-peer overlay network; wherein each processing device is configured to connect to the peer-to-peer overlay network as a peer node or as a client node; wherein a client node is connectable to the peer-to-peer overlay network via a peer node; wherein client nodes do not have routing or storage responsibilities; the method comprising:

causing one of a plurality of nodes of a cluster to perform a cluster head role connecting the cluster to the peer-to-peer overlay network, the processing device of the cluster head node thereby acting as a peer while other nodes of the cluster are attached to the cluster head as clients;

wherein each node of the cluster is associated with a private node identity and a public node identity; the public node identity being employed during the creation of a new cluster, in which the cluster only has one node, this node being the cluster head; the public node identity of the initial cluster head subsequently identifying the cluster within the overlay network as a cluster node identity;

wherein the cluster node having the cluster head role enables the other cluster nodes, which are attached to the cluster head as clients, to sleep in an energy-conserving state;

wherein the processing device, as cluster head role, transfers the cluster head role to another node of the cluster, such that the cluster head role is handed over from one node to another among the nodes in the cluster.

2. The method of claim 1, wherein when a node joins the overlay network for creation of a new cluster, there is created a cluster table containing an entry, indexed with the private node identity of the joining node, a next cluster head time; and a pre-configured cluster head period for that node.

3. The method of claim 1, wherein the peer-to-peer communications network is using Resource Location and Discovery Protocol (RELOAD) such that an attach request and an attach answer are used.

4. The method of claim 1:

wherein when a subsequent node joins the cluster, the cluster table is updated with a further entry, indexed with the private node identity of the subsequent node, a next cluster head time for the subsequent node and a pre-configured cluster head period for the subsequent node, wherein the subsequent node may act as a client and enter a sleep mode until it is time to initiate a cluster head handover.

5. The method of claim 4:
wherein when the cluster head period of the current cluster head is over, a cluster head handover process is initiated, in which a next cluster node according to a further entry in the cluster table is joining the overlay network as a peer cluster head, and is replacing the previous cluster head of the cluster table and is taking over the cluster head role;
wherein the handover process comprises the next cluster node getting a routing table from the old cluster head, as well as connecting to all the neighbor nodes of the previous cluster head in the overlay network, wherein the next cluster head employs the same public node identity as the old cluster head.

6. The method of claim 5:
wherein the next cluster head node sends an attach request to the previous cluster head node to initiate a cluster handover;
wherein the attach request message comprises an indication that the next cluster node is a client and an indication of a request to receive any recurring update messages;
wherein the next cluster head uses the cluster node identity as its sender identity instead of the private node identity of the next cluster head.

7. A processing device in a system of a plurality of processing devices communicatively connected via a peer-to-peer overlay network; wherein each processing device In the network is configured to connect to the peer-to-peer overlay network as a peer node or as a client node; wherein client nodes do not have routing or storage responsibilities; wherein a client node is connectable to the peer-to-peer overlay network via a peer node; the processing device comprising:
comprising a processing circuit;
network interface circuitry connected to the processing circuit;
memory containing instructions executable by the processing circuit; the instructions, when executed by the processing circuit, causing the processing device to perform a cluster head role connecting a cluster of nodes to the peer-to-peer overlay network such that the processing device thereby acts as a peer while other cluster nodes are attached to the cluster head as clients;
wherein the processing device, as cluster head role, is configured to transfer the cluster head role to another node of the cluster, such that the cluster head role is handed over from one node to another among the nodes in the cluster;
wherein the cluster node having the cluster head role enables the other cluster nodes, which are attached to the cluster head as clients, to sleep in an energy-conserving state
wherein each of the nodes of the cluster are associated with a private node identity and a public node identity; the public node identity being employed during the creation of a new cluster, in which the cluster only has one node, this node being the cluster head; the public node identity of the initial cluster head subsequently identifying the cluster within the overlay network as a cluster node identity.

8. The processing device of claim 7, wherein the peer-to-peer communications network is using a Resource Location and Discovery Protocol (RELOAD) such that an attach request and an attach answer are used.

9. The processing device of claim 7:
wherein a next cluster head node sends an attach request to the previous cluster head node to initiate a cluster handover;
wherein the attach request message comprises an indication that the next cluster node is a client and an indication of a request to receive any recurring update messages;
wherein the next cluster head uses the cluster node identity as its sender identity instead of the private node identity of the next cluster head.

10. The processing device of claim 7, wherein when a node joins the overlay network for creation of a new cluster, there is created a cluster table containing an entry, indexed with the private node identity of the joining node, a next cluster head time; and a pre-configured cluster head period for that node.

11. The processing device of claim 10:
wherein, when a subsequent node joins the cluster, the cluster table is updated with a further entry, indexed with the private node identity of the subsequent node, a next cluster head time for the subsequent node and a pre-configured cluster head period for the subsequent node;
wherein the subsequent node may act as a client and enter a sleep mode until it is time to initiate a cluster head handover.

12. The processing device of claim 11;
wherein, when the cluster head period of the current cluster head is over, a cluster head handover process is initiated, in which a next cluster node according to a further entry in the cluster table is joining the overlay network as a peer cluster head, and is replacing the previous cluster head of the cluster table and is taking over the cluster head role;
wherein the handover process comprises the next cluster node getting a routing table from the old cluster head, as well as connecting to all the neighbor nodes of the previous cluster head in the overlay network, wherein the next cluster head employs the same public node identity as the old cluster head.

13. A computer program product stored in a non-transitory computer readable medium for controlling operation of a system of a plurality of processing devices communicatively connected via a peer-to-peer overlay network; wherein each processing device is configured to connect to the peer-to-peer overlay network as a peer node or as a client node; wherein a client node is connectable to the peer-to-peer overlay network via a peer node; wherein client nodes do not have routing or storage responsibilities; the computer program product comprising software instructions which, when run on one or more processing circuits of the overlay network:
causes one of a plurality of nodes of a cluster to perform a cluster head role connecting the cluster to the peer-to-peer overlay network, the processing device of the cluster head node thereby acting as a peer while other nodes of the cluster are attached to the cluster head as clients;
wherein each node of the cluster is associated with a private node identity and a public node identity; the public node identity being employed during the creation of a new cluster, in which the cluster only has one node, this node being the cluster head; the public node identity of the initial cluster head subsequently identifying the cluster within the overlay network as a cluster node identity;

wherein the cluster node having the cluster head role enables the other cluster nodes, which are attached to the cluster head as clients, to sleep in an energy-conserving state;

wherein node performing the cluster head role transfers the cluster head role to another node of the cluster, such that the cluster head role is handed over from one node to another among the nodes in the cluster.

* * * * *